Nov. 17, 1970 C. V. FREIMAN ET AL 3,541,317

PARALLEL ADDITION AND DIVISION OF TWO NUMBERS BY A FIXED DIVISOR

Filed Aug. 9, 1967 31 Sheets-Sheet 1

INVENTORS
CHARLES V. FREIMAN
MERLE E. HOMAN

BY [signature]

ATTORNEY

Nov. 17, 1970 C. V. FREIMAN ET AL 3,541,317

PARALLEL ADDITION AND DIVISION OF TWO NUMBERS BY A FIXED DIVISOR

Filed Aug. 9, 1967 31 Sheets-Sheet 5

Nov. 17, 1970 C. V. FREIMAN ET AL 3,541,317

PARALLEL ADDITION AND DIVISION OF TWO NUMBERS BY A FIXED DIVISOR

Filed Aug. 9, 1967 31 Sheets-Sheet 6

Nov. 17, 1970 C. V. FREIMAN ET AL 3,541,317

PARALLEL ADDITION AND DIVISION OF TWO NUMBERS BY A FIXED DIVISOR

Filed Aug. 9, 1967 31 Sheets-Sheet 16

FIG. 9A

| R | F | C | $P_A$ |
|---|---|---|---|
| 0 | 0 | 0 | 0 |
| 0 | 0 | 1 | 1 |
| 0 | 2 | 0 | 2 |
| 0 | 2 | 1 | 0 |
| 1 | 0 | 0 | 1 |
| 1 | 0 | 1 | 2 |
| 1 | 2 | 0 | 0 |
| 1 | 2 | 1 | 1 |
| 2 | 0 | 0 | 2 |
| 2 | 0 | 1 | 0 |
| 2 | 2 | 0 | 1 |
| 2 | 2 | 1 | 2 |

FIG. 9B

| R | F | C | $P_S$ |
|---|---|---|---|
| 0 | 0 | 0 | 0 |
| 0 | 0 | 1 | 1 |
| 0 | 2 | 0 | 1 |
| 0 | 2 | 1 | 2 |
| 1 | 0 | 0 | 1 |
| 1 | 0 | 1 | 2 |
| 1 | 2 | 0 | 2 |
| 1 | 2 | 1 | 0 |
| 2 | 0 | 0 | 2 |
| 2 | 0 | 1 | 0 |
| 2 | 2 | 0 | 0 |
| 2 | 2 | 1 | 1 |

Nov. 17, 1970 C. V. FREIMAN ET AL 3,541,317

PARALLEL ADDITION AND DIVISION OF TWO NUMBERS BY A FIXED DIVISOR

Filed Aug. 9, 1967 31 Sheets-Sheet 24

FIG. 14A

| MOD 3 SUBTR | | |
|---|---|---|
| TOP LEFT INPUT | TOP RIGHT INPUT | OUTPUT |
| 0 | 0 | 0 |
| 0 | 1 | 1 |
| 0 | 2 | 2 |
| 1 | 0 | 2 |
| 1 | 1 | 0 |
| 1 | 2 | 1 |
| 2 | 0 | 1 |
| 2 | 1 | 2 |
| 2 | 2 | 0 |

FIG. 14B

| MOD 3 ADDER | | |
|---|---|---|
| TOP LEFT INPUT | TOP RIGHT INPUT | OUTPUT |
| 0 | 0 | 0 |
| 0 | 1 | 1 |
| 0 | 2 | 2 |
| 1 | 0 | 1 |
| 1 | 1 | 2 |
| 1 | 2 | 0 |
| 2 | 0 | 2 |
| 2 | 1 | 0 |
| 2 | 2 | 1 |

FIG. 14C

| $Q_F - Q_P$ | |
|---|---|
| INPUT | OUTPUT |
| 0 | 0 |
| 1 | 0 |
| 2 | 0 |
| 3 | 1 |
| 4 | 1 |
| 5 | 1 |
| 6 | 2 |
| 7 | 2 |
| 10 | 2 |
| 11 | 3 |
| 12 | 3 |
| 13 | 3 |
| 14 | 4 |
| 15 | 4 |
| 16 | 4 |
| 17 | 5 |
| 20 | 5 |
| 21 | 5 |
| 22 | 6 |
| 23 | 6 |
| 24 | 6 |
| 25 | 7 |
| 26 | 7 |
| 27 | 7 |

United States Patent Office 3,541,317
Patented Nov. 17, 1970

3,541,317
PARALLEL ADDITION AND DIVISION OF TWO NUMBERS BY A FIXED DIVISOR

Charles V. Freiman, Los Altos, and Merle E. Homan, Los Gatos, Calif., assignors to International Business Machines Corporation, Armonk, N.Y., a corporation of New York Filed Aug. 9, 1967, Ser. No. 659,436
Int. Cl. G06f 7/52
U.S. Cl. 235—164 13 Claims

ABSTRACT OF THE DISCLOSURE

A system for concurrently performing high speed addition and division of two numbers by a fixed divisor. The system includes means for concurrently forming remainders in a highly parallel fashion while the addition is being performed in a highly parallel carry look-ahead adder. Additional means are included for merging the results of the addition and the remainder generation whereby the final quotient digits are obtained substantially concurrently with the generation of the final remainder. Many logic levels and thus time are saved by performing these operations in parallel.

BACKGROUND OF INVENTION

The present invention relates to a system for performing highly parallel high speed addition and division. The invention has particular utility in memory addressing systems wherein a specified address is to be modified by an index address. In most present day high speed memories, especially of the three dimensional core storage type, virtually all address decoding is done on a power of two basis, i.e., 2, 4, 8, 16, 32, etc. This applies to both the X–Y addressing and also to situations where a plurality of individual data words are included within a single memory word. Thus, in a memory word of for example 64 bits, there may be two data words of 32 bits each or 4 data words of 16 bits each. In such memory systems it is conventional to provide the single memory address of the desired data word from which the memory word address may be decoded together with the relative position of the desired data word within the memory word.

Assuming, for example, an address of 430 were given for a desired data word in a memory organization having four data words per memory word. This address 430 written in binary form could be decoded to find the proper memory address of a 107 by merely shifting the binary address to the right two bit positions as will be understood by those skilled in the art. Further, the particular data word designated by the address 430 would be the second data word stored at the memory word location designated by the addesss 107. Individual memory word addresses and data word addresses within the particular memory word may thus be easily decoded for memory organizations wherein the number of data words are a power of two, as stated previously, by merely shifting the single data word address provided to the system. However, as may be well appreciated, many situations may arise wherein the limitation of a power of two data words per memory word is neither convenient nor efficient in terms of maximum utilization of the memory capacity. In the past, due to the complexity and time involved in performing division of an address by conventional means, i.e., performing the division one digit at a time beginning with highest order digit, generating a quotient and a remainder for this digit, and rippling the remainder down to the next highest order digit and reperforming the division, etc., is very time consuming and has not been seriously considered in previous memory accessing systems. When the problem of indexing a base address by a fixed increment, an index is considered in addition to the problem of performing a division other than a power of two the performance time required for such operations has precluded their use in any prior known systems.

Modern day computer technology, especially in the areas of memory design and fabrication, are allowing even larger numbers of bits to be concurrently accessed in a single memory fetch. For example, in certain IBM 360 Models, as many as 288 bits may be accessed per memory cycle. It is also entirely possible in the reasonably foreseeable future that this number of bits per access may be significantly increased. It may thus readily be seen that limiting the number of data words within such a large access to a power of two, i.e., 2, 4, 8, 16, etc. is quite limiting on system design wherein it would be desirable to achieve maximum utilization of memory storage capabilities.

CROSS REFERENCE TO RELATED APPLICATION

A high speed division circuit for performing highly parallel division utilizing the principle of remainder look-ahead with a fixed divisor is disclosed and claimed in copending application #654,579 filed July 19, 1967, entitled "High Speed Division System" of J. Cocke et al.

SUMMARY OF INVENTION AND OBJECTS

It has now been found that a specialized hardware system may be provided for performing high speed combined addition/division operations in a highly optimized manner. By performing addition and remainder generation in parallel utilizing a high degree of remainder look-ahead circuitry, the combined operation may be performed in little more time than would normally be required solely for the addition operation. The system, while practically limited to fixed divisor division, would be useful in any environment wherein such fixed divisor division problems are present. However, it is believed to have particular utility in address decoding circuitry for use with memories capable of accessing up to W data words per access wherein W is not a power of 2 and may therefore not be decoded by mere truncation of low order bits and wherein the additional problem arises of modifying a given address with a fixed index provided by the system. Use of the present adder/divider system allows a much more flexible design of memory systems wherein the number of words per memory access may be altered by changing a relatively small block of hardware in the address decoding circuitry and also with little sacrifice in time to perform the division.

It is accordingly a primary object of the present invention to provide a very high speed addition/division system.

It is a further object of the invention to provide such a system for use in the address generating and decoding portion of a memory control system.

It is another object of the invention to provide such a high speed addition/division system featuring parallelism of the addition and remainder generation portions thereof.

It is a still further object to provide such a high speed addition/division system having a high degree of parallelism within the remainder generating portion per se of said system.

It is a still further object of the invention to provide such an addition/division system wherein parallel generated carries, remainders and sum digits are merged in producing the final output.

Other objects and advantages of the present invention will be apparent from the following description of a preferred embodiment of the invention as set forth in the specification and drawings.

BRIEF DESCRIPTION OF DRAWINGS

FIGS. 2A–L comprise a detailed functional block diagram of a preferred embodiment of the present addition/division system.

FIG. 9A is a truth table for the $P_A$ boxes of FIG. 6.

FIG. 9B is a truth table for a $P_S$ box of FIG. 7.

FIGS. 14A–C are truth tables for the indicated devices on FIGS. 2 and 10–12(A–C).

DESCRIPTION OF DISCLOSED EMBODIMENT

Figure 1:
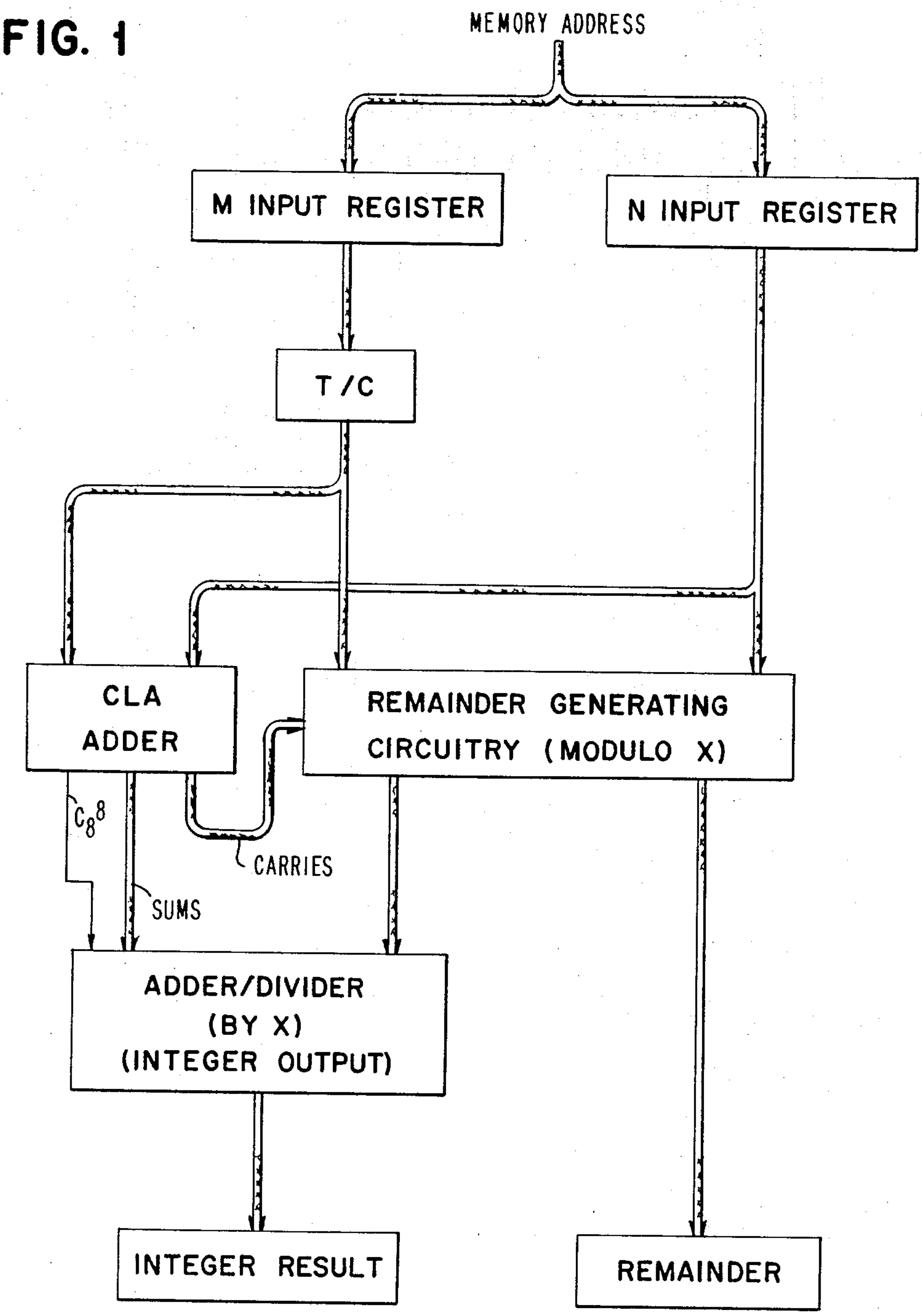
FIG. 1 is a functional block diagram of the present addition/division system.

The objects of the present invention are accomplished in general by a high speed addition/division system for effectively dividing the sum of a pair of multiple digit numbers by a fixed divisor. The system includes a quotient generating stage associated with each pair of digits of said input numbers and a remainder generating stage. Each said quotient generating stage, except that for the highest order quotient digit, includes a remainder generating portion, an accumulator, and a divider. A high speed adder is provided wihch provides final sums and interdigit carries substantially in parallel with the operation of said remainder generating portion and provides its interdigit carry output to said accumulator and its sum output to said divider. The accumulator combines the carry for a particular sum digit with the remainder from all higher order stages and a possible correction factor and produces an output representative of these three combined factors. The divider includes means for generating an effective dividend digit by combining the sum digit from said adder with the output from said accumulator and for dividing said digit by said divisor to produce an integer quotient digit. In the highest order quotient generating stage, the digit carryout may be entered directly into the divider for that stage together with the high order sum bit from the adder. The output from the accumulator in the remainder portion of the quotient generating stage represents the final remainder.

By utilizing the present addition/division system the interdigit remainders and final remainder are generated substantially in parallel with each other and in parallel with the sum generation. The final division to obtain each quotient digit requires the combining of the particular sum digits from the adder with a quantity from the accumulator representing all higher order remainders, carries and a possible correction factor. Dividing these results by the divisor to produce the individual quotient digits may similarly be done in parallel. By further incorporating in hardware or taking advantage of the particular numerical characteristic of the radix utilized in the system, together with the fixed divisor, a number of savings in circuit levels and thus time may be obtained. Illustrations of such design modification based on the particular numerical system utilized will be apparent from the subsequent description and by reference to the previously cited co-pending application Ser. No. 654,579.

The present system is designed so that the remainder generating circuitry operates concurrently on two digits of siad input numbers to produce final interdigit remainders in parallel with the operation of the adder. A final result or quotient may thus be obtained in very little more time than would be required for the addition alone. As stated previously, such a system has particular utility in the generation of memory word and data word addresses in a memory system wherein the address is given in terms of a base address and an index and where the memory word format is non-standard or where, for example, the number of data words contained in a single memory word is not a power of 2. Thus, the memory word address would not be obtainable by simply shifting or truncating the overall data word address to in effect divide said address by the number of data words in each memory word to obtain the memory word address.

Before proceeding with a detailed description of the preferred embodiment of the invention as represented in the detailed functional block diagram of FIG. 2 and the detailed drawings of FIGS. 3–8, the overall system will first be described by reference to the generalized functional block diagram of FIG. 1 and also the numerical examples of FIGS. 10(A–C), and 12(A–C). Referring first to FIG. 1, it will be noted that in the upper part of this figure two boxes marked M Input Register and N Input Register appear. These are the registers into which the base and index address respectively are gated by the overall memory controls for computation of the ultimate memory word and data word address. For purposes of describing the present embodiment, it will be assumed that N is the base address and M is the index address which may be either added to or subtracted from the base. The true/complement gates indicated by the block marked T/C on the figure operates to gate the true or complement version of the index M into both the CLA Adder and the Remainder Generation Circuitry. The block labelled CLA Adder is a conventional high speed carry look-ahead adder of the type disclosed, for example, in U.S. Pat. 2,879,001 of Weinberger, et al. entitled "High-Speed Binary Adder Having Simultaneous Carry Generation." This Adder produces the final sum digits marked $S_8^0$–$S_8^7$ on FIG. 2(A–L). It also produces the final interdigit carries utilized in the Adder on the lines marked $C_8^1$–$C_8^8$ on FIG. 2(A–L). As will be described subsequently, it is necessary to obtain these interdigit carries and enter them appropriately into the P boxes in order to obtain the correct computation of the quotient digits. The block marked Adder/Divider (by X) Integer Output represents the final division operation performed by blocks $Q_F$–$Q_P$ on FIG. 2(A–L). This section actually produces the individual integer quotient digits as will be explained subsequently. As will be similarly explained subsequently, the generation of the final quotient digits may also be done substantially in parallel a very short time after the final sums and carries are received from the Carry Look-Ahead Adder.

The block marked Remainder Generation Circuitry (Modulo X) refers to that portion of the system devoted primarily to determining the interdigit remainders in the present system. This is done in a highly parallel fashion and does not require waiting on the division of a higher order digit to be completed to form a quotient and remainder for rippling of the remainder into the next stage and successive determinations made as is the case of conventional dividers wherein each division must proceed and the remainders rippled down in sequence to lower order stages. The actual interdigit remainders are determined by this block including the final remainder and although not a true function of the remainder generation circuitry, the carries obtained from the CLA Adder are shown entering this block where they are appropriately combined with the interdigit remainders in the accumulators for transfer back into the block labelled Adder/Divider. The Remainder Generation Circuitry block thus provides a final remainder output and also an input into the adder/divider block as shown in FIG. 1 which performs the final quotient digit determination.

A typical numerical example of a memory arrangement wherein a memory word contains 7 data words (i.e., not a power of 2) will now be described. The total address of the data word in memory is taken as 92466.

=7√9 2 4 6 6

1
=7√9 (2) 2 4 6 6

1 3
=7√9 2 (1) 4 6 6

1 3 2
=7√9 2 4 (0) 6 6

1 3 2 0
=7√9 2 4 6 (6) 6

1 3 2 0 9
=7√9 2 4 6 6 +3/7

The above example shows how one might sequentially perform the simple division:

$$\frac{92466}{7}=13209+3/7$$

by inspection. Note, however, that if all of the intermediate remainders (in parenthesis) are known initially, it is possible to generate the quotient digits in the following manner.

$$\left[\frac{(0)\quad 9}{7}\right]\left[\frac{(2)\quad 2}{7}\right]\left[\frac{(1)\quad 4}{7}\right]\left[\frac{(0)\quad 6}{7}\right]\left[\frac{(6)\quad 6}{7}\right]=13209$$

The symbol [ ] denotes "integer part of."

Figure 13A:
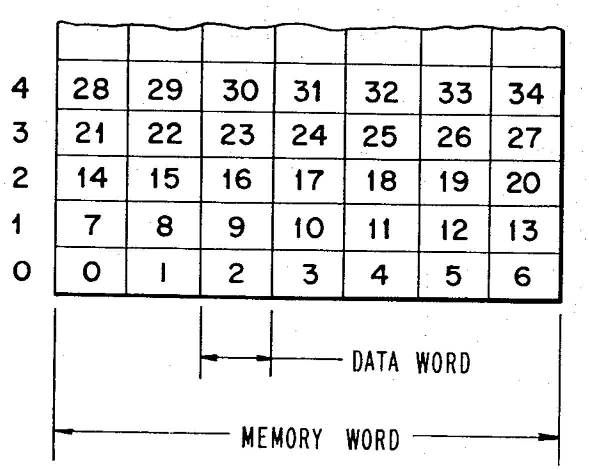
FIG. 13A is a diagrammatic representation of a section of a large computer memory wherein each memory word has a plurality of data words stored therein.
Figure 13B:
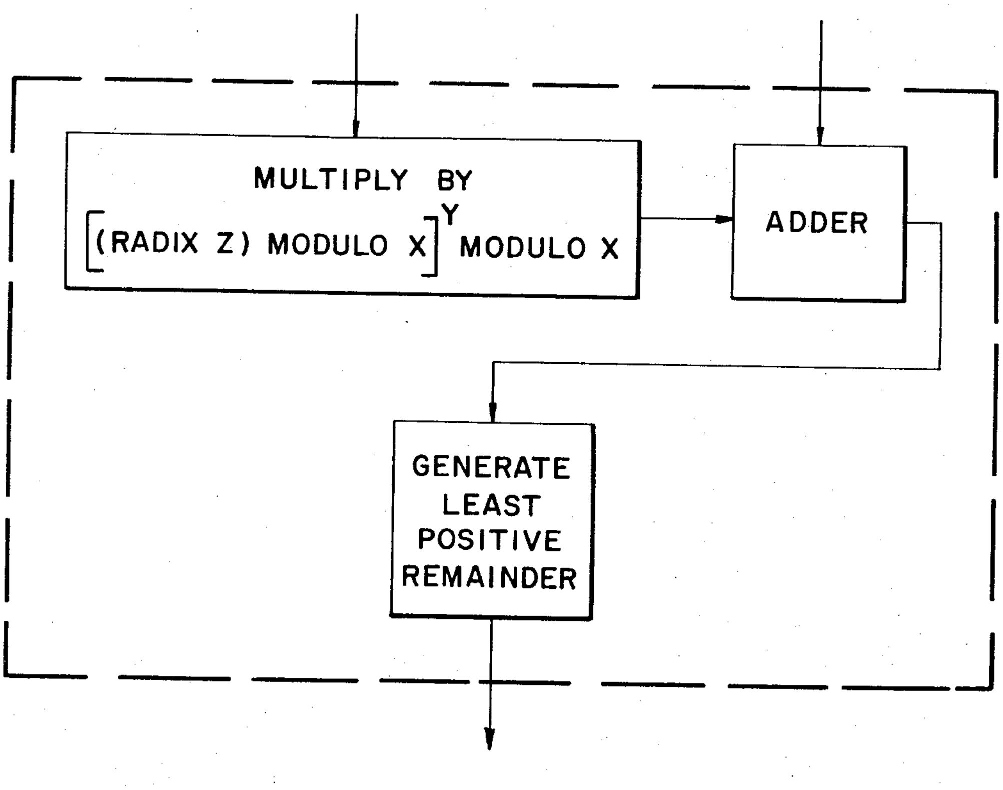
FIG. 13B is a functional block diagram of the MOD 3 ADDER and SUBTR boxes on FIGS. 2 and 10–12.

The aforementioned co-pending application treats in detail the manner in which remainders may be parallel generated and propagated from digit stage to digit stage in a highly parallel Remainder Generation Circuit of the type utilized both in said co-pending application and in the present application. It further describes in specific detail together with numerical examples the manner in which the various interdigit remainders are formed. The numerical examples include a dividend of radix 10 and a fixed divisor of 7, a dividend of radix 8, a fixed divisor of 7, a dividend of radix 10, a fixed divisor of 5, and finally the preferred system utilizing a dividend or number system of radix 8 and a fixed divisor of 3. This is believed to be the most practical numerical system for utilization in conventional digital computers utilizing binary format since the binary format may be broken up into groups of three bit bytes or digits which, as will be well understood, are equivalent to a base 8 digit since any number from 0 to 7 may be represented by the three binary bits. Thus an octal digit is in essence built into such standard binary format by utilizing adjacent three bit bytes beginning with the radix point. The box of FIG. 13B illustrates a generalized functional block basic to such Remainder Generating Circuitry. It in essence receives a first (right hand) input which is the output of a Modulo Converter such as the C box detailed in FIG. 3 or the output of another similar unit. The second (left-hand) input represents a remainder quantity propagated down from a higher order digit location. However, this higher order propagated remainder must be multiplied by a factor K which may be determined from the equation $$K=[(\text{"radix } Z\text{"})\text{ Modulo } X]^{Y}$$

modulo X, wherein Y=the displacement in digit orders of the higher order input. Thus, assuming a base or radix of 8, and a fixed divisor of 3, which determines the modulo, the quantity within the bracket becomes 2 since there are two three's in 8 leaving a remainder of 2. Assuming an input is received from two digit columns to the left the number 2 would be squared thus $2^2=4$ which modulo 3 becomes 1. However if Y equals an odd power, K will work out to 2. However, since +2 becomes −1 when a three is subtracted therefrom, $k$ may be represented as a −1 and the number appearing at the left-hand input becomes negative as will be apparent. Thus, for even values of Y the block of FIG. 13B becomes in essence a subtractor. Thus all of the devices on FIGS. 2(A–L), 10(A–C), 11(A–C), and 12(A–C) indicated as MOD–3 Adder and MOD–3 Subtr cause their left-hand inputs to be multiplied by a (+) or (−) 1 respectively which is added to the right-hand input and produces an output with all 3's extracted to produce their least positive remainder, i.e., 0–2. For each effective dividend digit (in the present adder-divider system a pair of input digits) a final or terminal remainder must be produced for each level or order which takes into account remainders propagated down from all high order stages in addition to the remainder from the particular effective dividend digit. This may be done by cascading the Modulo–3 Adders and Subtractors as disclosed both in the cited co-pending application and in the present application. As stated previously, whether an adder or subtractor is used depends upon the displacement of the left-hand input.

The generalized block diagram of FIG. 1 would hold true regardless of the radix Z or the fixed divisor X which is chosen for the system. Essentially the primary changes that would be necessitated would be a change in the multiplication factor utilized within the boxes all of which are designated as Modulo–3 adders or subtractors in the present embodiment. It will be understood by referring to the cited co-pending application that the multiplication factor K for these boxes would vary considerably with different bases, however, the basic system organization of, for example, FIGS. 2(A–L) would still hold true. It will of course be understood that all of the modulo units would be working on some other fixed divisor X rather than 3 as is used in the present preferred embodiment.

The present system as stated previously differs from that of the cited co-pending application in that instead of a single dividend digit, in effect, two dividend digits must be processed in parallel in the remainder circuitry while the said two dividends are separately added in an appropriate adder.

Referring now to the composite view of FIGS. 2(A–L), which will hereinafter be simply referred to as FIG. 2, it will be noted that the two numbers M and N are placed into the Input Registers at the top of this figure. As was described previously, both of these numbers are broken up into three bit bytes. In the present example two 24 bit input numbers are used which provide two radix 8 numbers each having 8 digits.

The eight digits representing the index M are numbered $M_8{}^0$ through $M_8{}^7$ going from low to high order and similarly the digits for the base address N are numbered $N_8^0$ through $N_8^7$. The subscripts 8 appearing throughout FIG. 2 indicate that the present example is designed for a base or radix of 8, i.e., 3 binary bits in one octal byte. The actual remainder generating circuitry is broken up into essentially eight stages. The low order stage is indicated as the Remainder Stage and the ultimate output of this stage from the block 22 marked $P_A$ is the final remainder for the system. It will be noted that the final outputs from the other stages numbered Stage 1 through Stage 7 produce final outputs going to the $Q_F$–$Q_P$ boxes which produce quotient digits $Q_0$–$Q_7$. There is no remainder into the high order $Q_F$–$Q_P$ box 10 as will be readily understood.

By referring to the drawing it will be noted that all of the M digits pass through a pair of True/Complement gates 52 or 72 depending upon whether the True line 50 or Complement line 62 is energized. As will be readily understood, the true line is energized when it is desired to perform a regular addition in the system and the complement line is energized when it is desired to perform an algebraic addition of a negative number M or subtraction. The output of the complement gate is of course handled in both the adder and the Remainder Generation Circuitry as in a normal addition and certain other manipulations occur such as the injection of a "hot one" in both the adder and the remainder circuitry to compensate for this complementing operation. However, this latter operation will be explained subsequently with reference to the numerical examples. It should be noted in passing, however, that the "hot one" is injected on the line marked $C_8^0$ entering the right-hand side of the CLA adder and also the box 22 marked $P_A$ in the Remainder Stage.

It will be noted that all of the dividend or M and N digits pass through the blocks marked C. These are Modulo 3 Converters. The number 3 is of course determined by the fact that the fixed divisor is 3. The output of these Converters is the least positive remainder when all multiples of the fixed divisor are removed from the respective dividend digits entering same. The outputs from the Converter boxes for each pair of dividend digits goes into a single Modulo 3 Adder one being provided for each remainder state at the upper level. These are indicated by the numeral 200. The output of each of these adders 200 is again the least positive remainder when all multiples of three are extracted from the sum of the inputs thereto. Thus, the output of the Adders 200 represent the composite remainder from each pair of dividend digits. The direct output from this adder in Stage 7 is the complete remainder of Stage 7. By cascading the outputs of these adders from higher to lower order in the Remainder Stage, the respective complete remainders are formed. Thus, in Stage 6 the output from the adder 200 in Stage 7 provides the left-hand input, and the right-hand input is provided from the output of the adder 200 in the same stage. However, this block 202 is indicated as a Mod 3 Subtr since it is receiving its left-hand input from the adjacent Stage. The output of block 202 is thus the final remainder for this Stage. The various outputs of the other Stages are obtained in a similar manner. Thus, the input to block 204 in Stage 5 is obtained from block 200 of this Stage (right-hand) and from block 202 of Stage 6 (left-hand). The output of block 204 is thus the remainder figure for Stage 5. It will be noted that in order to conserve time at some cost in hardware, the output from Stage 202 is passed not only to Stage 5 but also to Stage 4 and that the intermediate remainder from Stage 5 is combined in block 206 with the initial output for the Stage and the output of 206 is in turn combined in block 208. The output from block 208 goes directly into its own P box and is also supplied in parallel to similar blocks for the four subsequent low order Stages. As in the previously mentioned situation, this is to allow the generation of the remainders to occur largely in parallel wherein each remainder does not have to wait until the output of a higher order Stage is complete. Thus at some cost in hardware considerable saving in operating time is achieved. It will be noticed that the lower block in all of the remainder generating stages are either marked $P_A$ or $P_S$. The inputs to these blocks are the remainders on the lines marked R, a feedback input on the lines marked F or $\overline{F}$ and the carry inputs from the adder marked C.

The P boxes essentially combine the remainders (R) as determined by the actual Remainder Generating Circuitry just described and the interdigit carries which were generated during the addition. This latter operation is necessary since it must be remembered that the $Q_F$–$Q_P$ boxes must provide the proper quotient digit for a pair of dividend digits. Thus, excluding any remainder consideration for the moment, the quantity (4+5) divided by 3 is properly 9 divided by 3 not 1 divided by 3, where 1 is the sum digit with a 1 carry (all octal base). Therefore, the carry input provides a corrective input to the final divider boxes ($Q_F$–$Q_P$) so that the proper two octal digit number will be utilized in the said divider boxes $Q_F$–$Q_P$. It will be further noted that the remainder input for a particular P box represents a final remainder from all higher order digits while the carry digit is that produced by the particular addend and augend being summed in the Adder. The carry input to the low order $Q_F$–$Q_P$ box is $C_8^1$ which is the carry obtained when $M_8^0$ is added to $N_8^0$.

The lines marked Feedback (F or $\overline{F}$) enter a remainder correction factor due to certain operations where it is desired that a high order carry out be disregarded or eliminated in arriving at a specific address. The remainder circuitry as disclosed considers this carryout in determining the total remainders for the system and propagates the effect of this carry through the remainder circuitry. Thus, to remove this factor from the remainder outputs of the Remainder Stage and Stages 1 through 7, an amount representative of this remainder must be eliminated. To remove this factor from the remainder, the quantity 2 (base 8 modulo 3) must be alternatively added to and subtracted from the successive total remainders produced by the remainder generating circuitry. This operation is done in the $P_{S-A}$ boxes. If it were desired a 1 could be substituted for the 2 input to the $P_S$ boxes and this box replaced by a $P_A$, however, this would require two different inputs. The reason for this latter statement is that a −2 is equivalent Modula 3 to a +1. The situations in which this would occur will be described subsequently with reference to several numerical examples. It is noted in passing that the correction factor on the feedback lines is applied only when the system instruction indicates that the high order carry out is to be disregarded in the case of an add operation and an actual carry out occurs, or in any subtract operation.

It will be further noted that the carry input for the $P_S$ box of the Remainder Stage is marked $C_8^0$. This is the "hot 1" input which must be added in the low order stage in the case of a subtraction as is well known in the art. The "hot 1" is similarly entered into the CLA Adder to obtain the proper sum, however, it must also be inserted in the Remainder Stage in order to provide a proper final remainder.

Figure 2A:
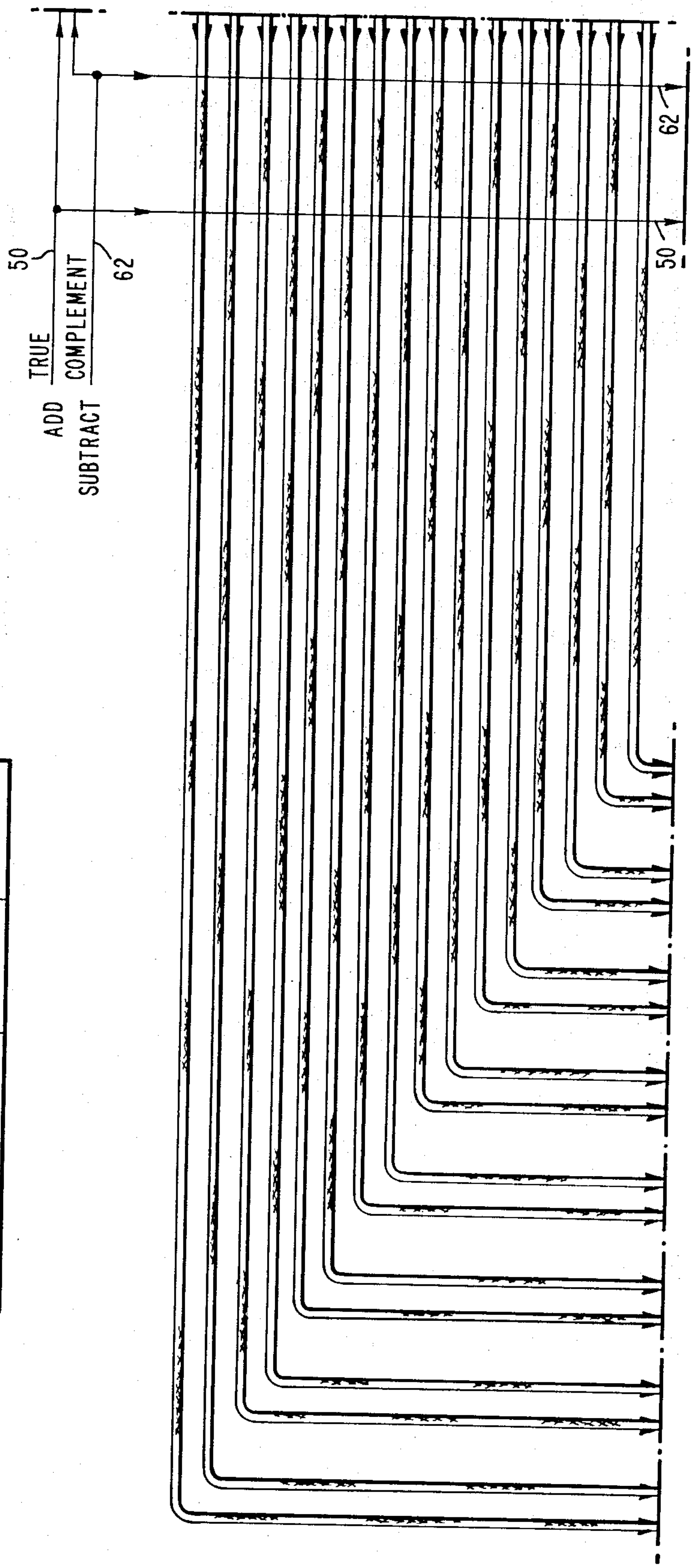
Figure 2:
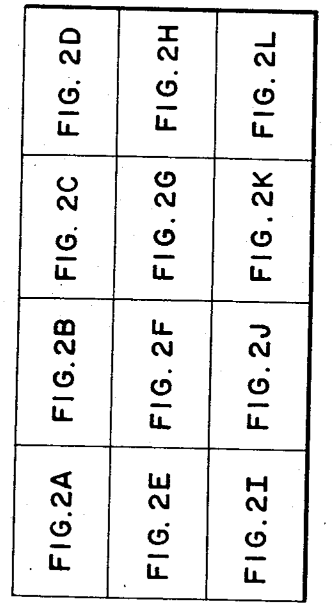
FIG. 2 is an organizational diagram of FIGS. 2A–L.
Figure 2B:
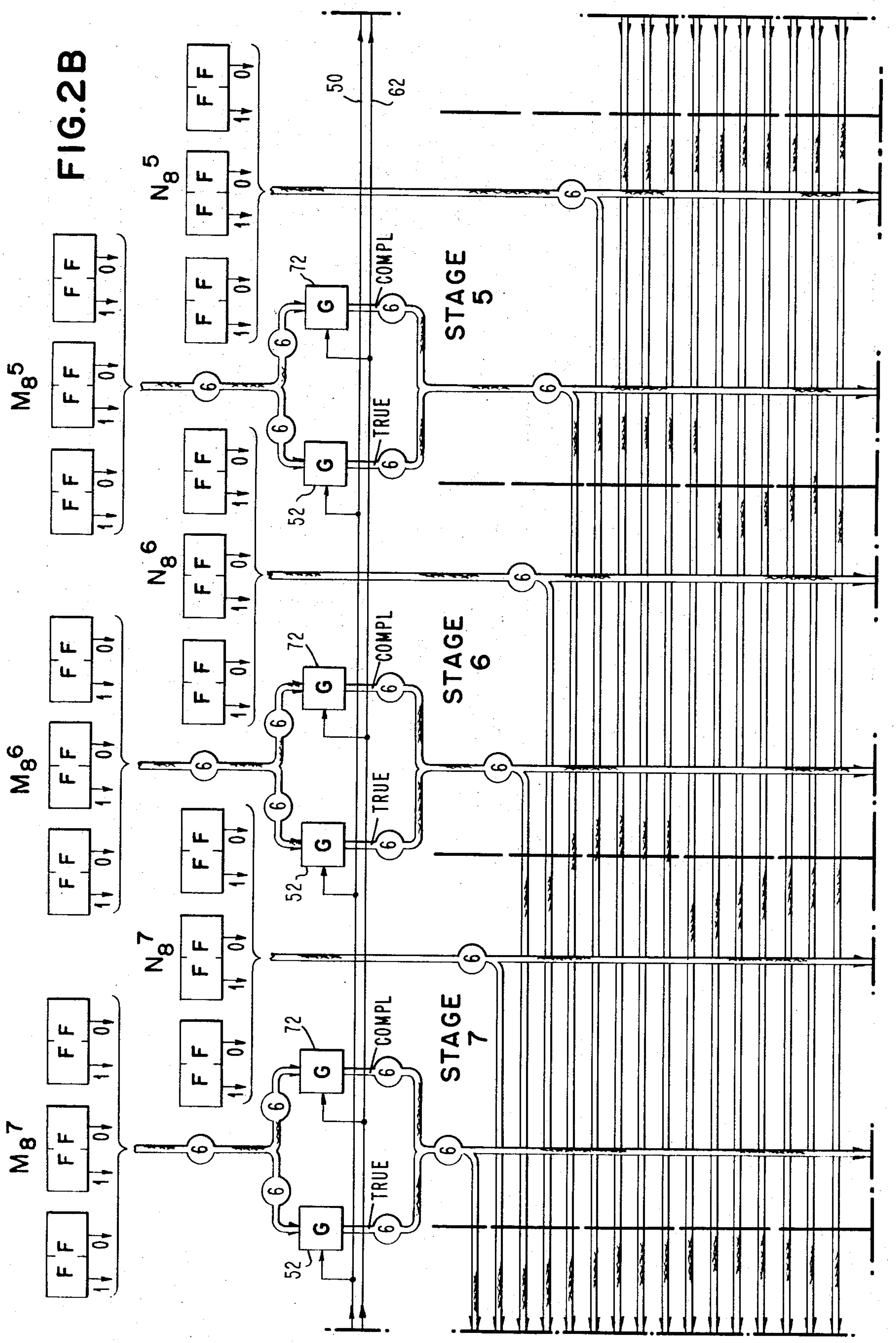
Figure 2C:
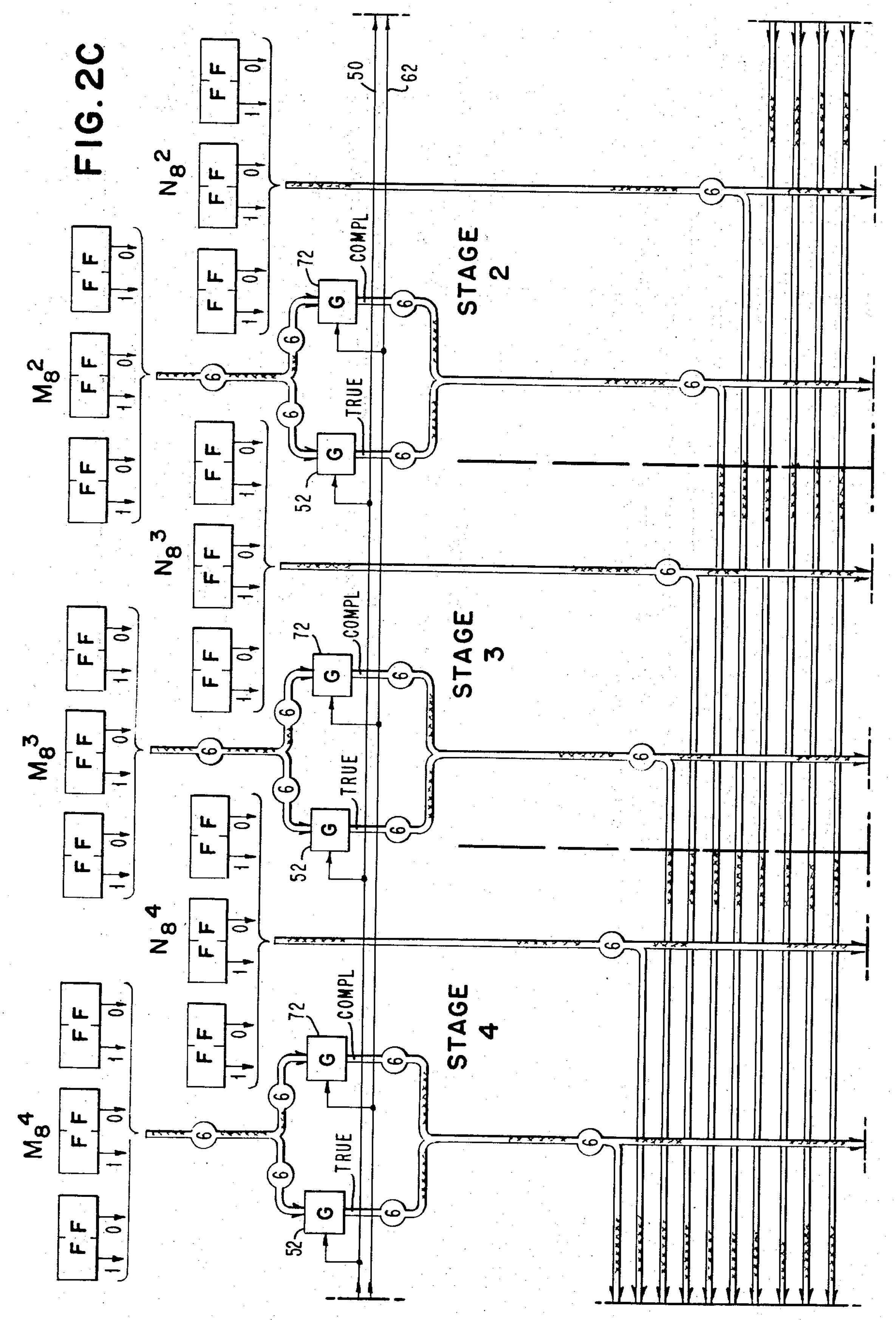
Figure 2D:
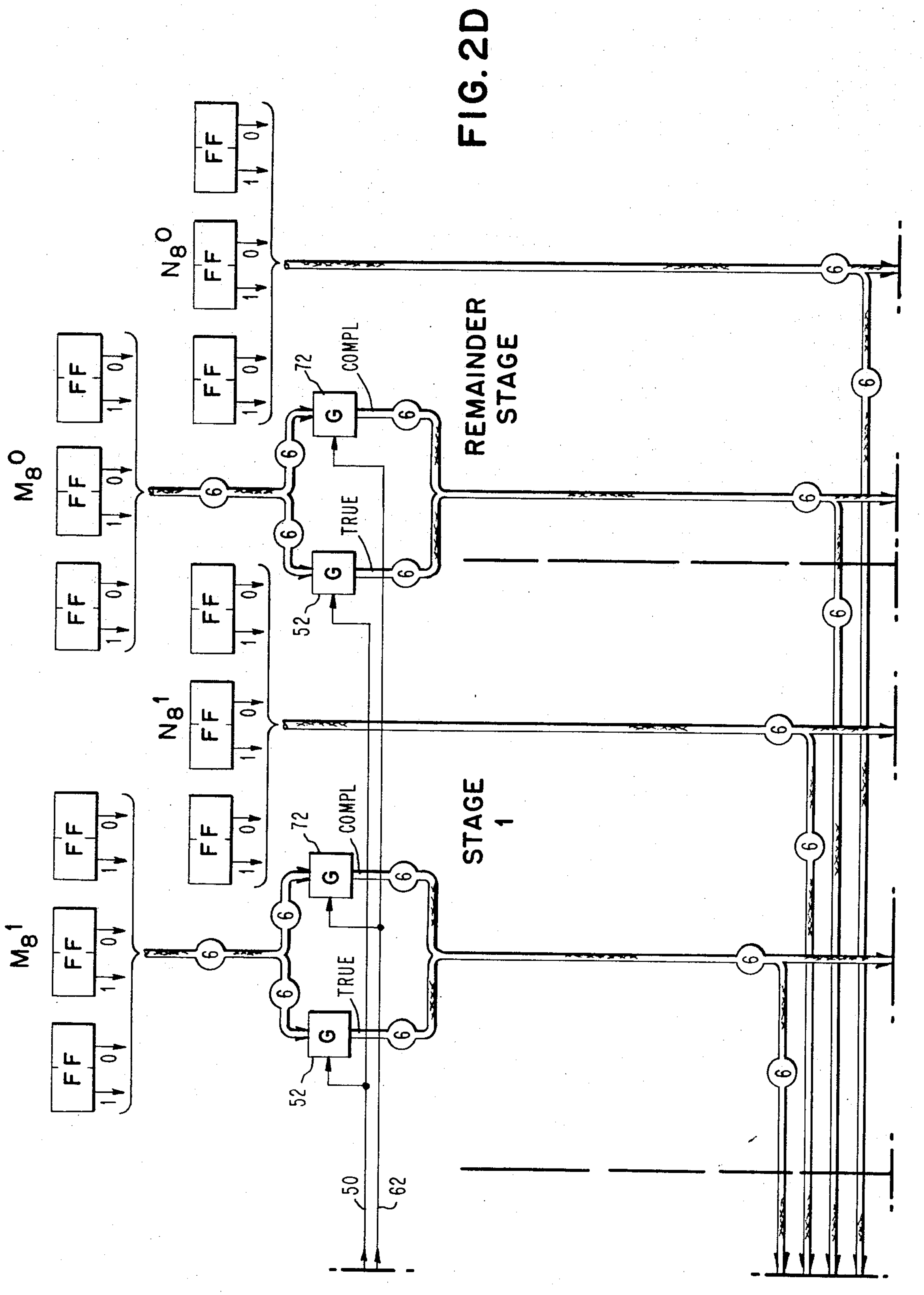
Figure 2E:
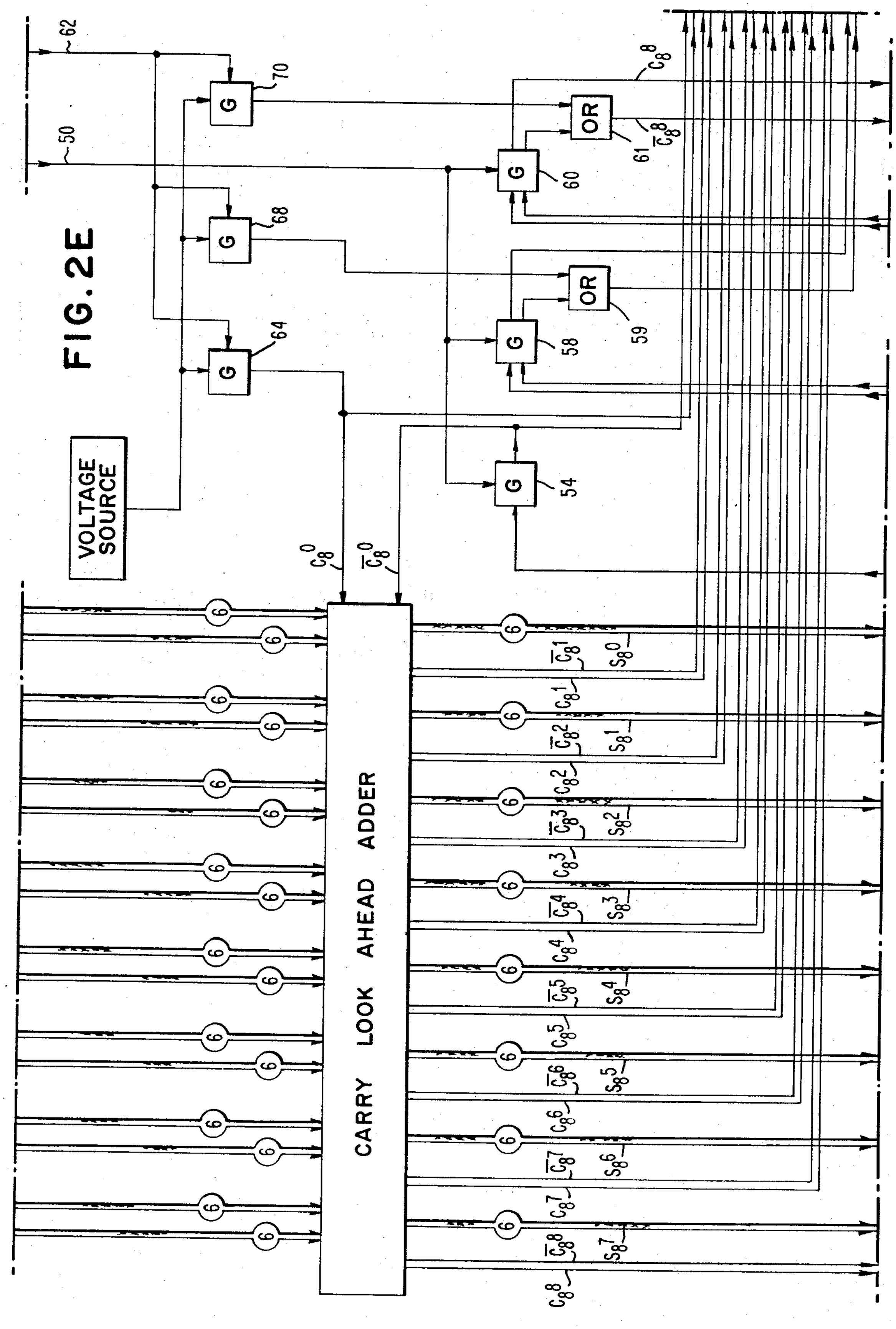
Figure 2F:
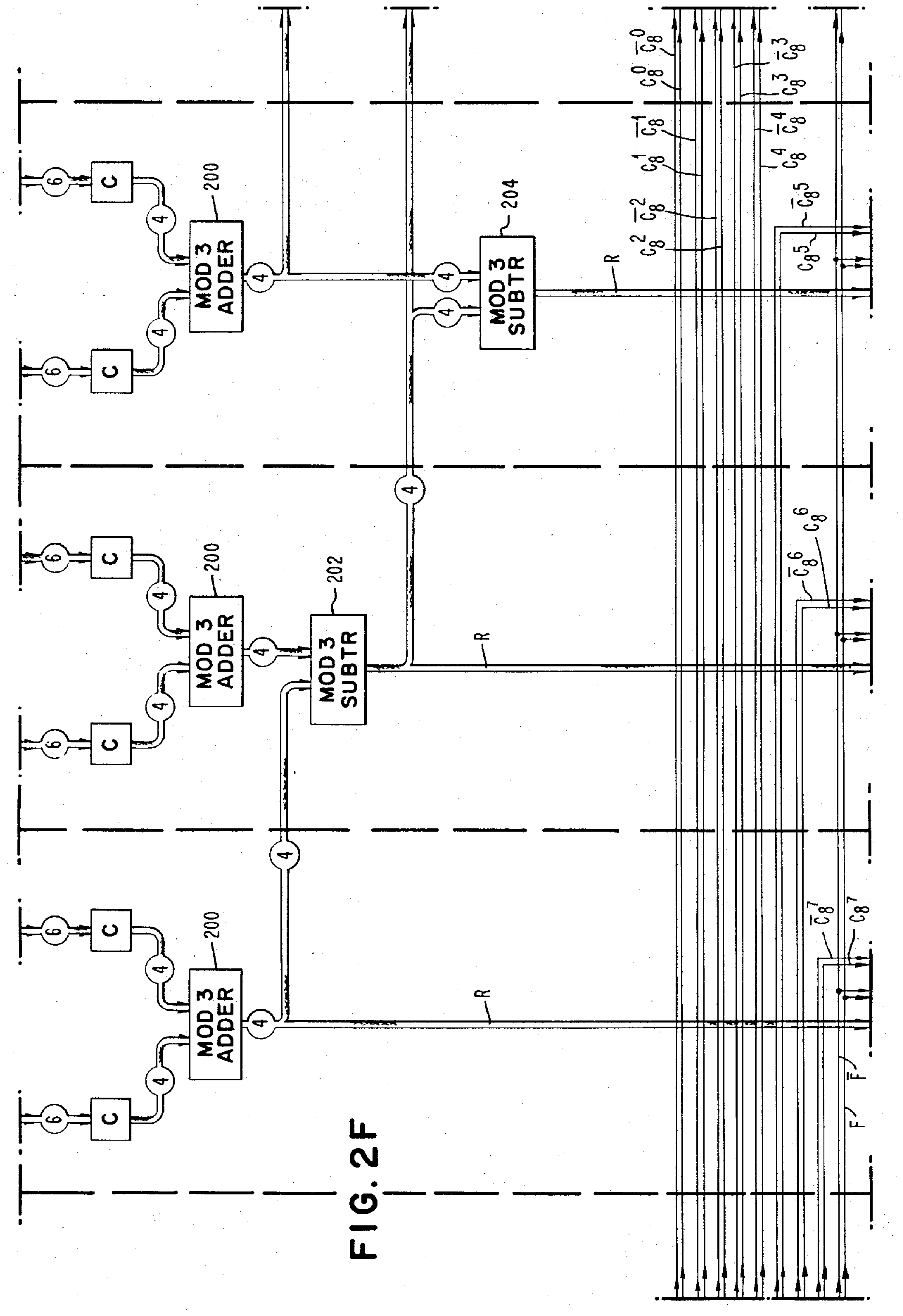
Figure 2G:
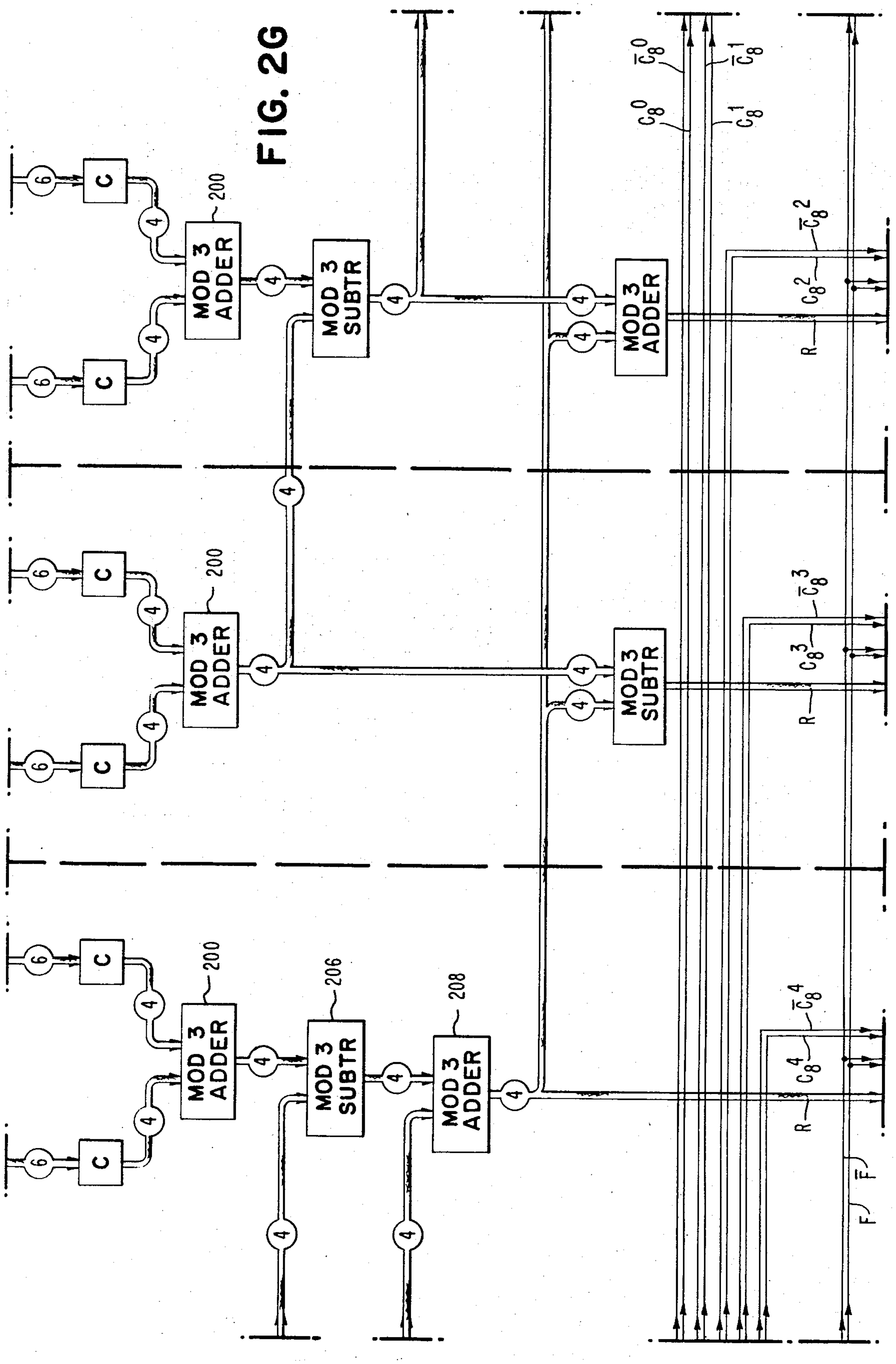
Figure 2H:
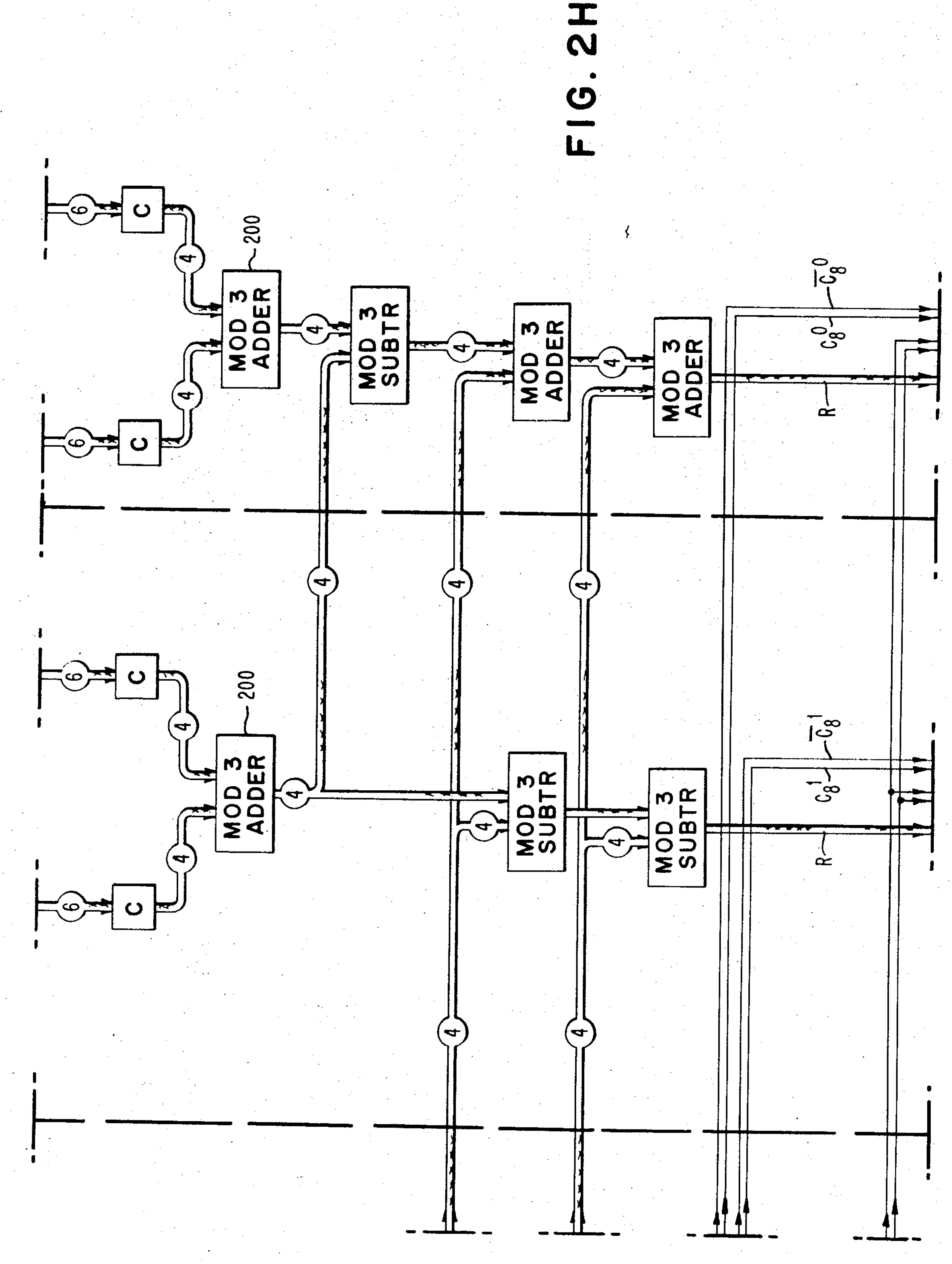
Figure 21I:
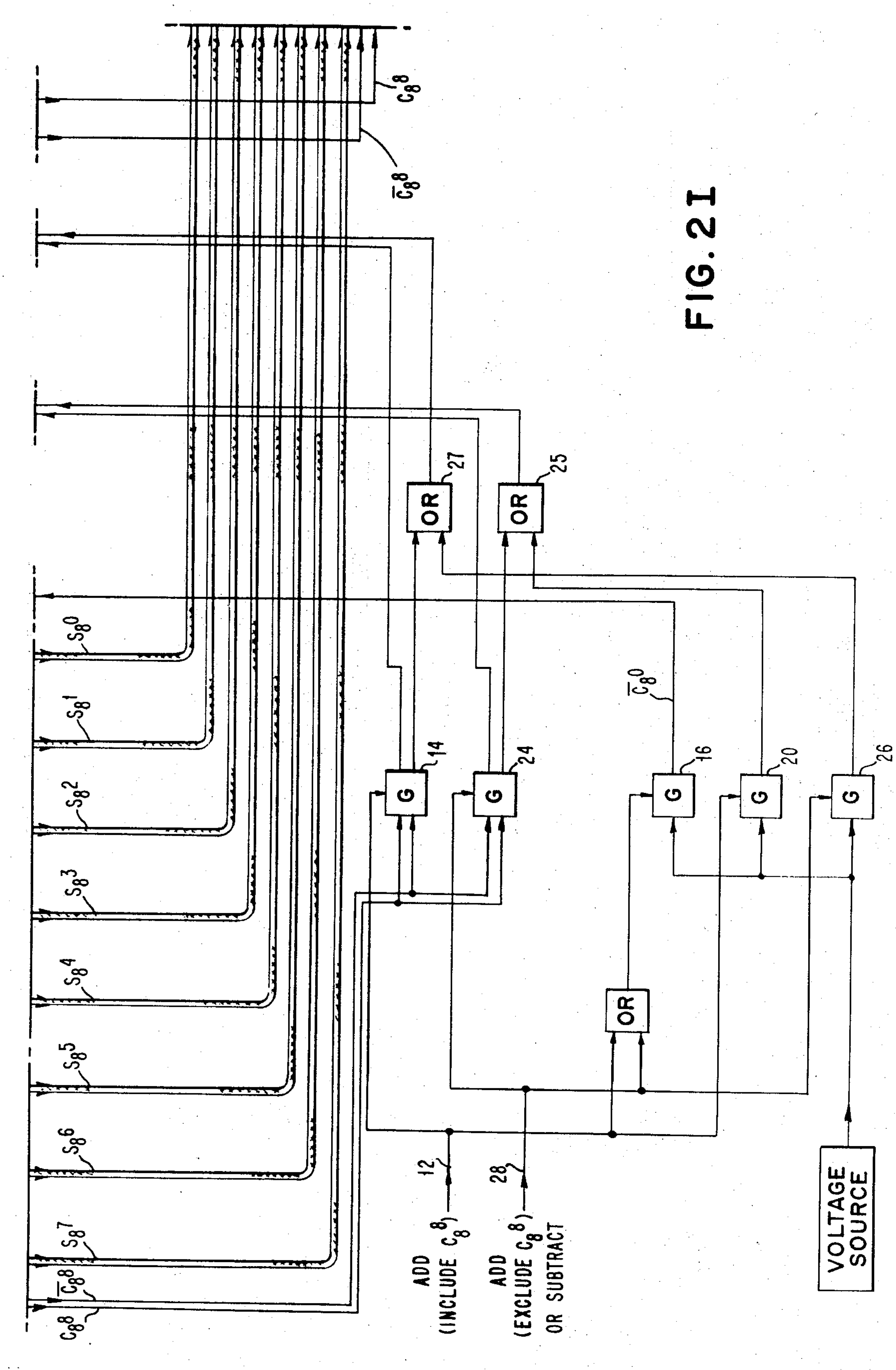
Figure 2J:
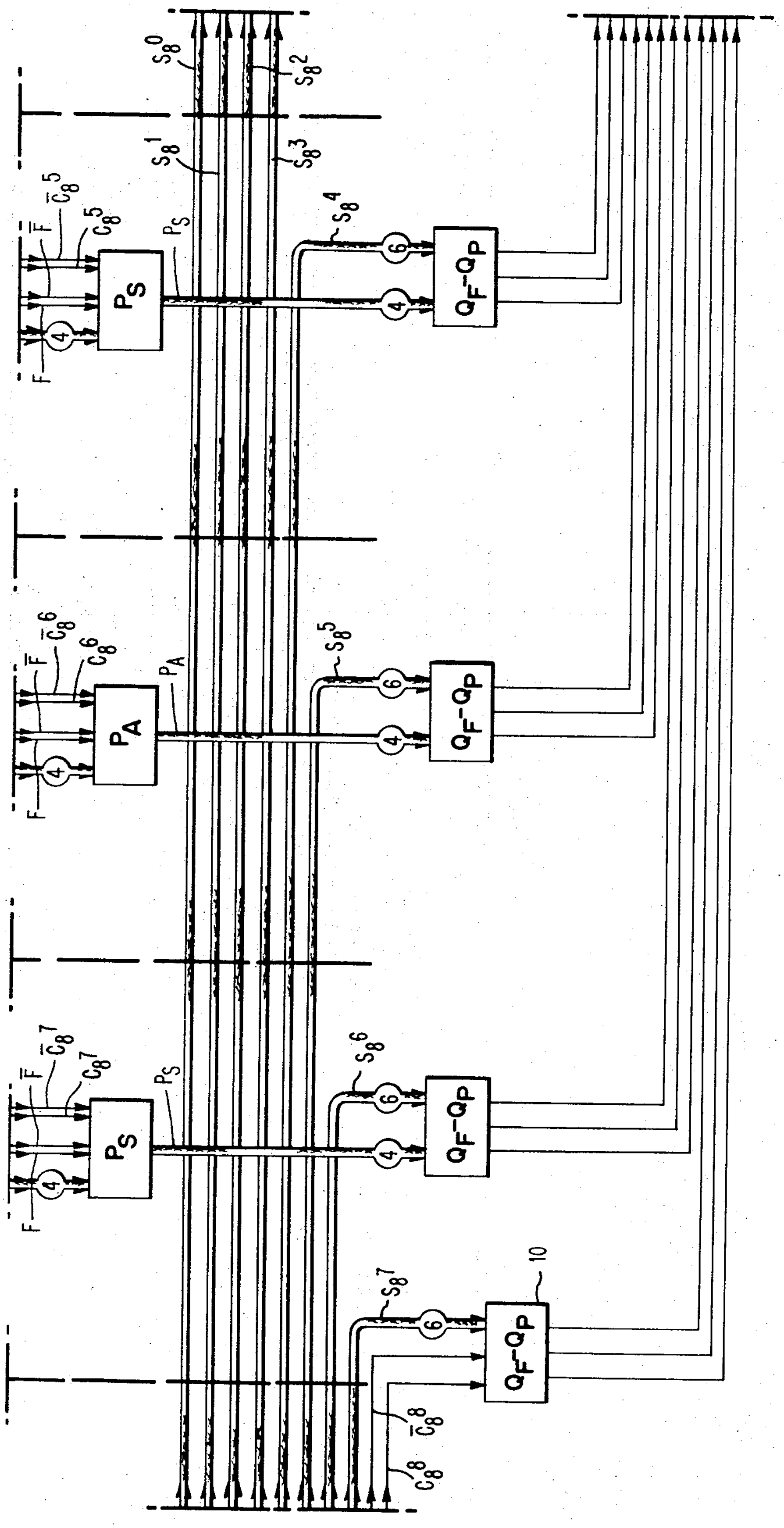
Figure 2K:
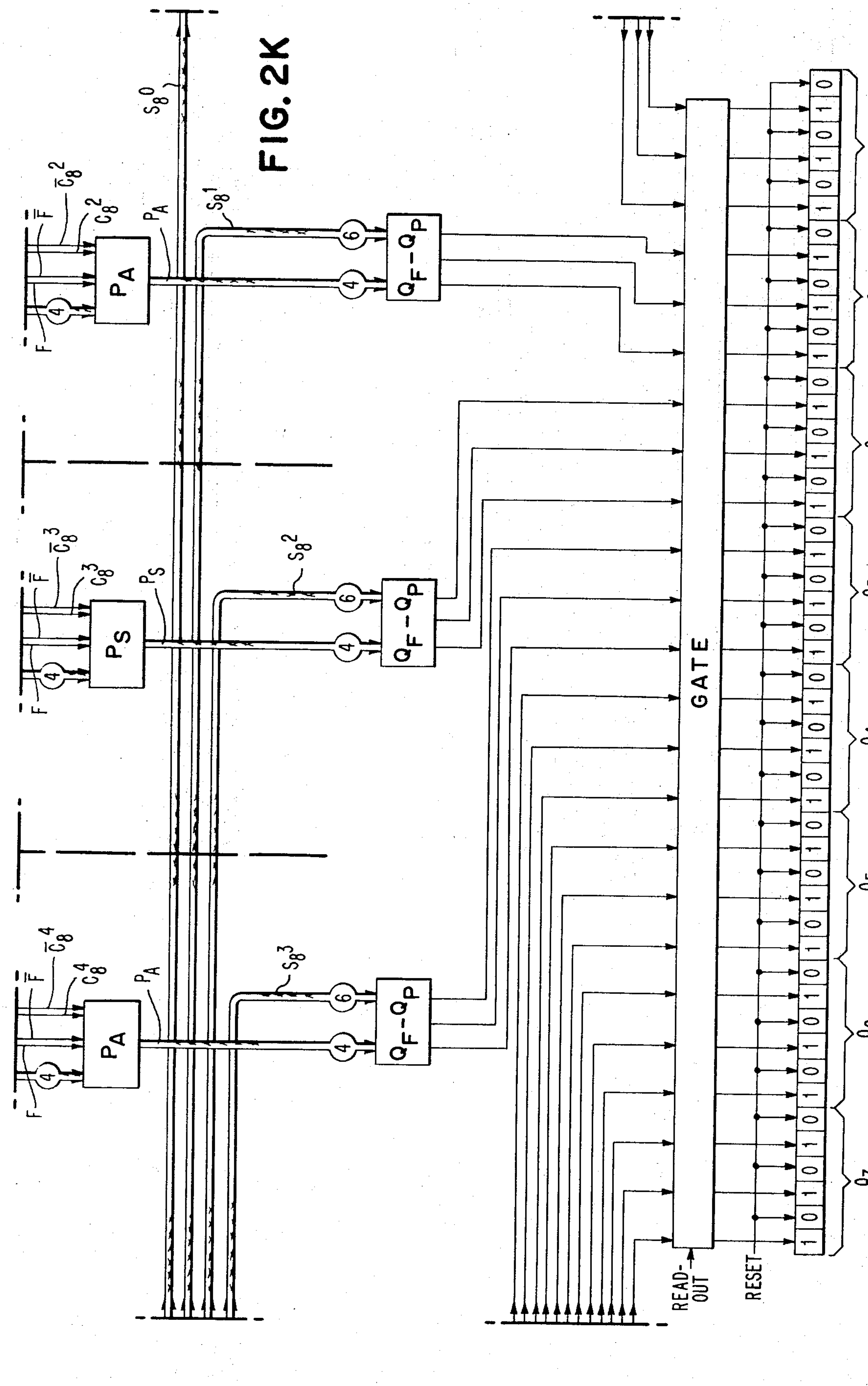
Figure 2L:
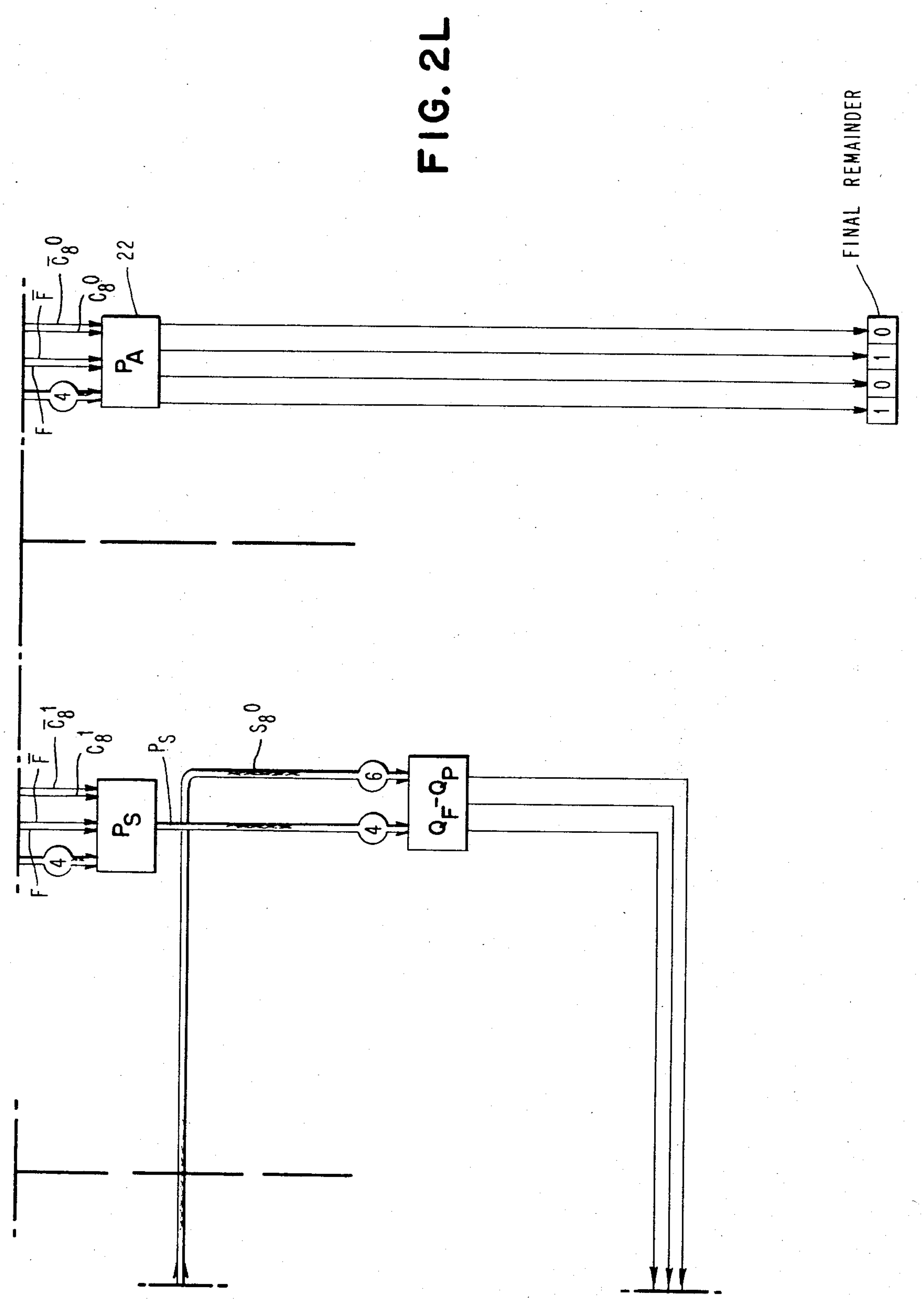

The Logic Circuitry including the various gate circuits and inputs appearing on FIGS. 2A, 2E and 2F contain the controls for inserting the "hot ones" where necessary, the high order carry out into the $Q_F$–$Q_P$ box 10 for the high order quotient digit and also the above-mentioned feedback signal (F). The sequence of operation of these controls will best be understood from the subsequent description of the numerical examples illustrating different operations with the present addition/division system.

It is reiterated at this time that the operation of the Carry Look-Ahead Adder and the Remainder Generating Circuitry down to the input of the $P_{S-A}$ boxes proceeds substantially in parallel and that the inputs to these P boxes are available substantially concurrently. Thus, it will be readily appreciated that the only additional time necessary for completion of the division operation over that of the operation of the simple index adder is that required for the information to flow through the P boxes and $Q_F$–$Q_P$ boxes. By referring to FIGS. 6, 7, and 8, it will be noted that there are relatively few logic levels in these boxes as illustrated and consequently very little time is required for the propagation of data therethrough. This fact points out the essential advantages of the system which allows the division operation to be performed by the present system with very little more cycle time than would be required for a simple addition thus making the provision of odd size memories quite practical from the point of view of time for execution.

Figure 3:
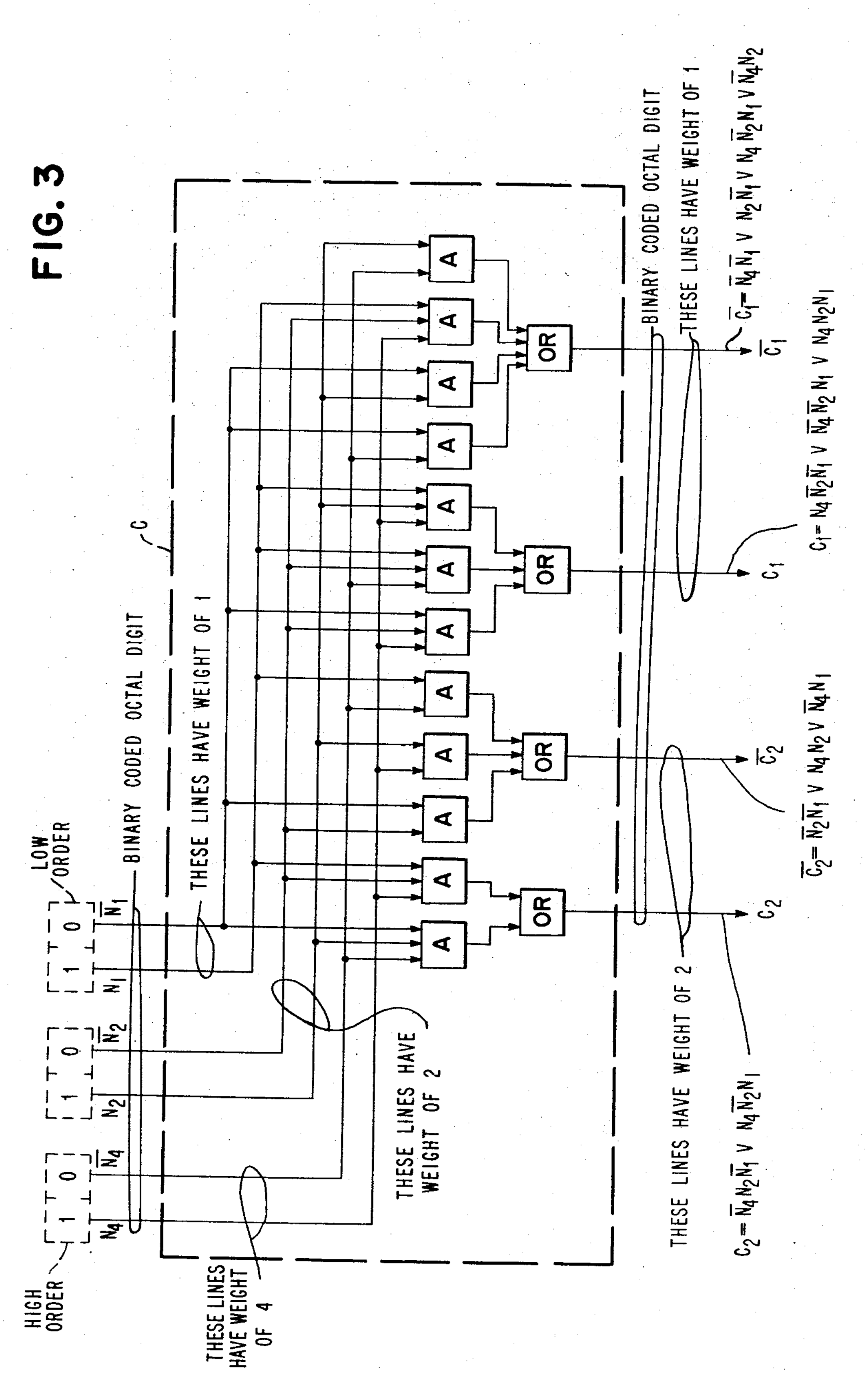
FIG. 3 is a logical schematic diagram of a C box of FIGS. 2A–L.

The actual contents of a Modulo 3 Converter or C box, as they appear on the composite drawing of FIG. 2, is shown in detail on FIG. 3. These devices must perform essentially a division function in that they cast out multiples of the fixed divisor (in this case, 3) and produce as an output the least positive remainder. The output lines of the C device are labelled $C_2$, $\overline{C}_2$, $C_1$, $\overline{C}_1$ become the top inputs to the Mod 3 Adders 200 on FIGS. 2A–L. The C box, as indicated in FIG. 3, is composed of conventional AND and OR logic elements.

Figure 4:
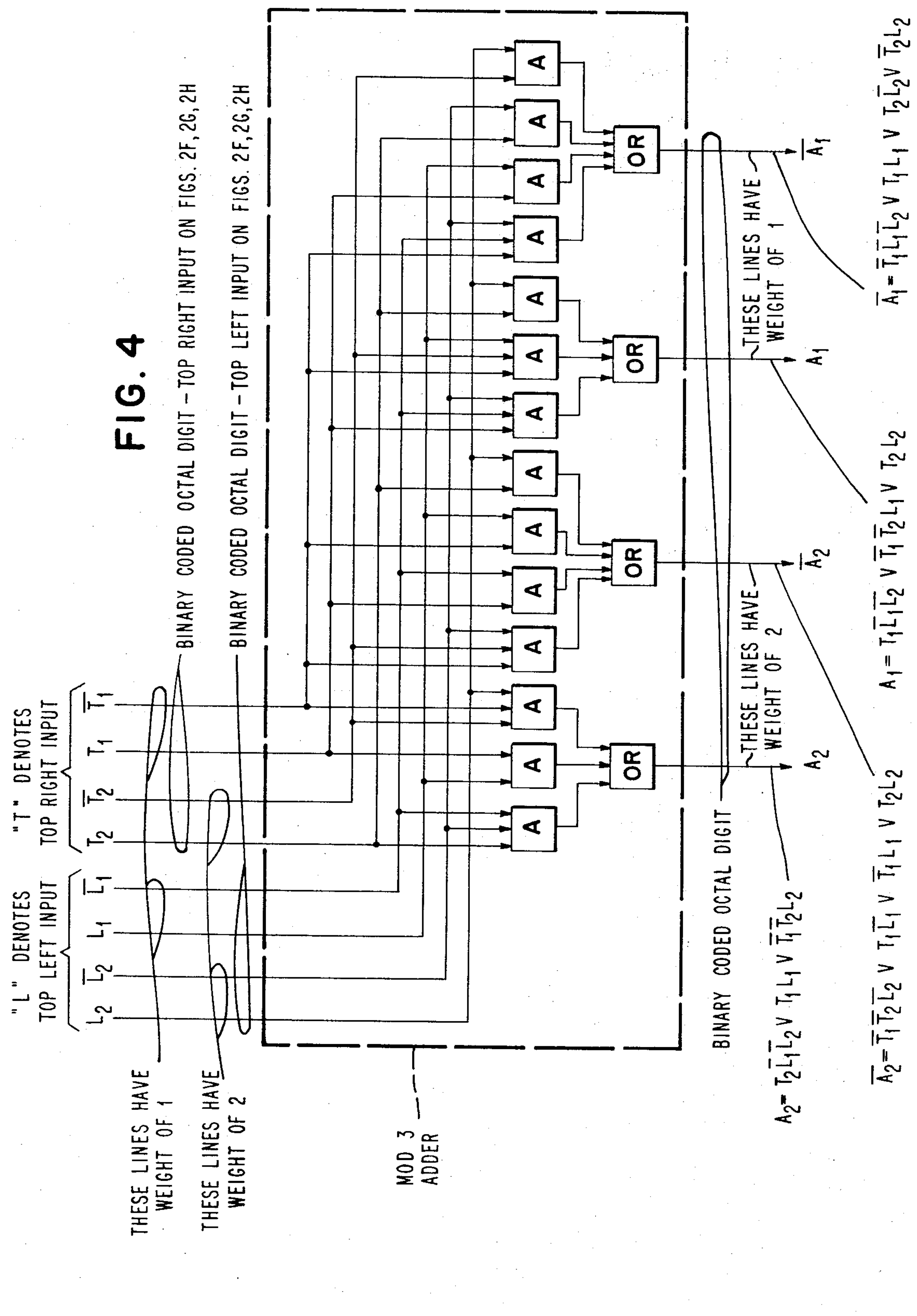
FIG. 4 is a logical schematic diagram of a Mod 3 Adder of FIGS. 2A–L.

FIG. 4 is a detailed logical schematic diagram of the Modulo 3 Adders shown on FIGS. 2A–L. Regardless of their inputs, they perform the same function. The various inputs marked as T and L indicate the four top right inputs and the four top left inputs respectively as shown in FIG. 2. Again, the contents of these blocks is shown in conventional AND/OR logic gate format. The logic for these blocks is quite straight forward. The logical equations for each output line for both this figure and FIG. 3 are shown on the figure adjacent to the output lines for simplicity and ease of understanding.

By definition the outputs of the C boxes, the Modulo 3 Adders, and the Modulo 3 Subtracters may only be 0, 1, or 2. Thus, only pairs of output lines representing binary weights of 1 and 2 are required for any of these three functional units.

Figure 5:
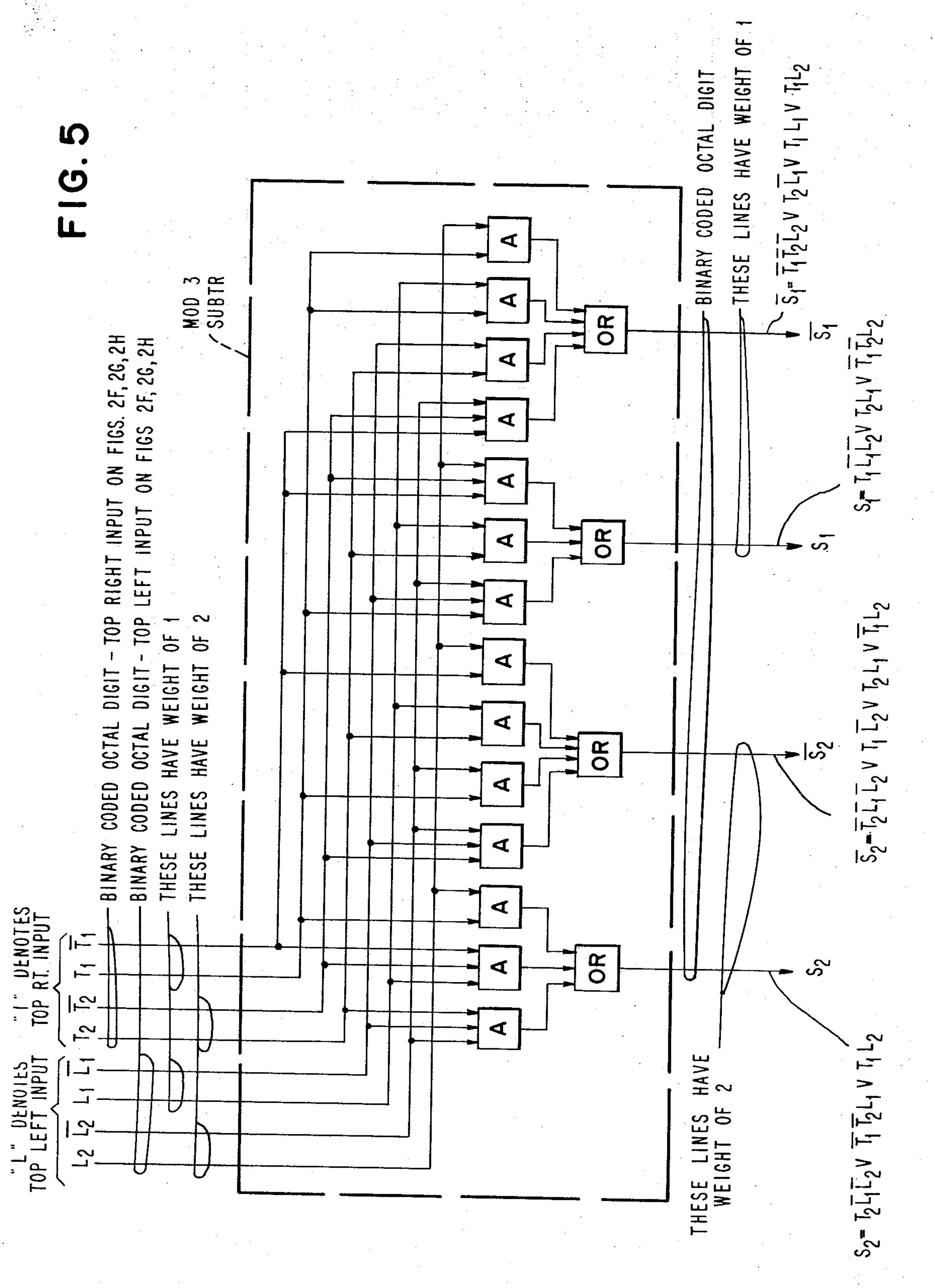
FIG. 5 is a logical schematic diagram of a Mod 3 Subtractor of the system of FIGS. 2A–L.

FIG. 5 comprises a logical schematic diagram of the blocks labelled Modulo 3 Subtr on FIG. 2. As in FIG. 4, the inputs to this block are labelled T and L and represent four top right and four top left inputs respectively as shown. The outputs labelled S go to other functional units as indicated on FIG. 2. The various logical equations for the output lines are specified on this drawing as in both FIGS. 3 and 4.

Truth tables for the Modulo 3 Adders and Modulo 3 Subtracters are shown on FIGS. 14A and B respectively. The numbers indicated in these truth tables and also for the truth tables of FIGS. 14C, 9A and 9B are expressed in octal digits.

Figure 6:
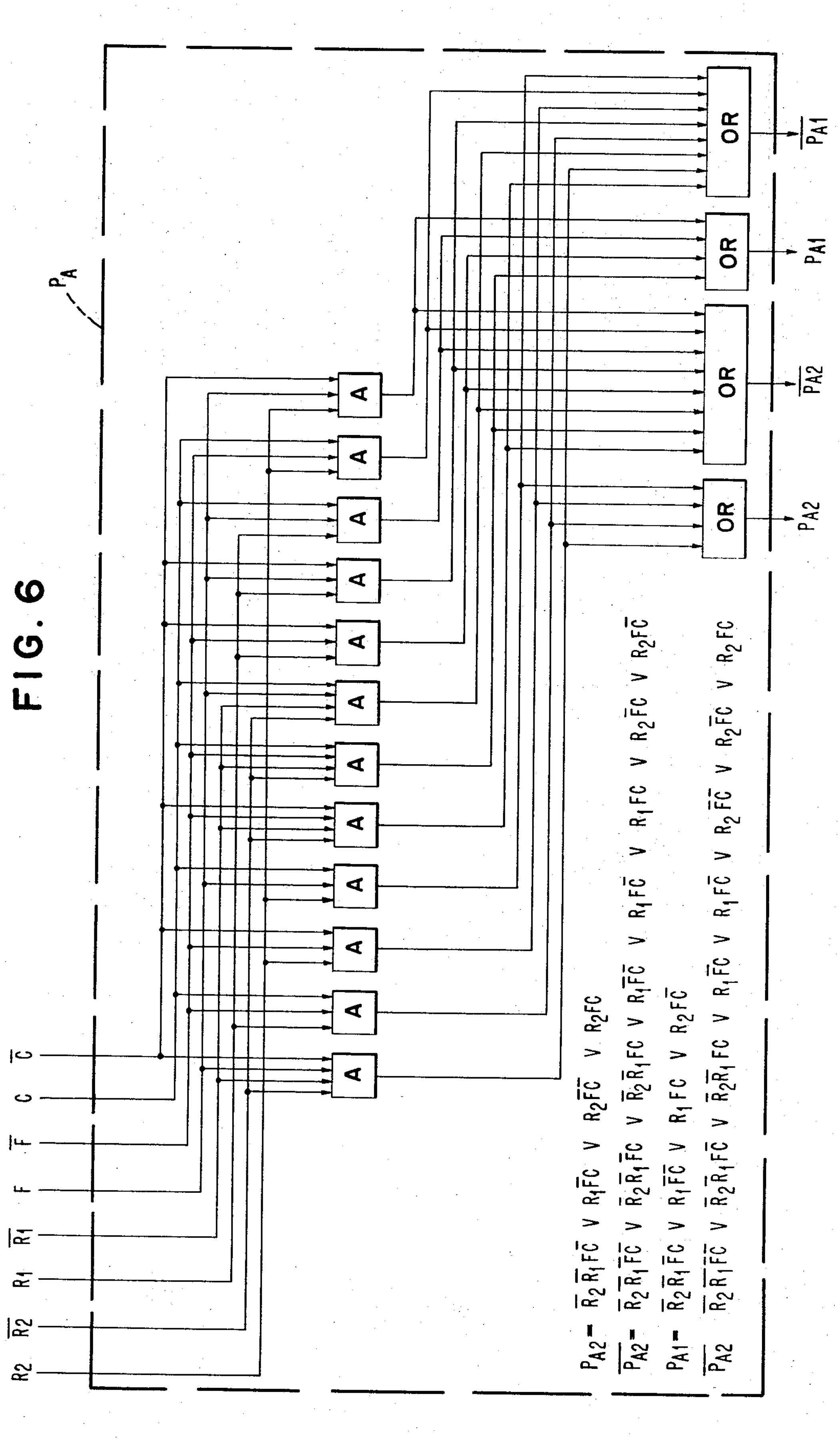
FIG. 6 is a logical schematic diagram of the $P_A$ boxes of the system of FIGS. 2A–L.
Figure 7:
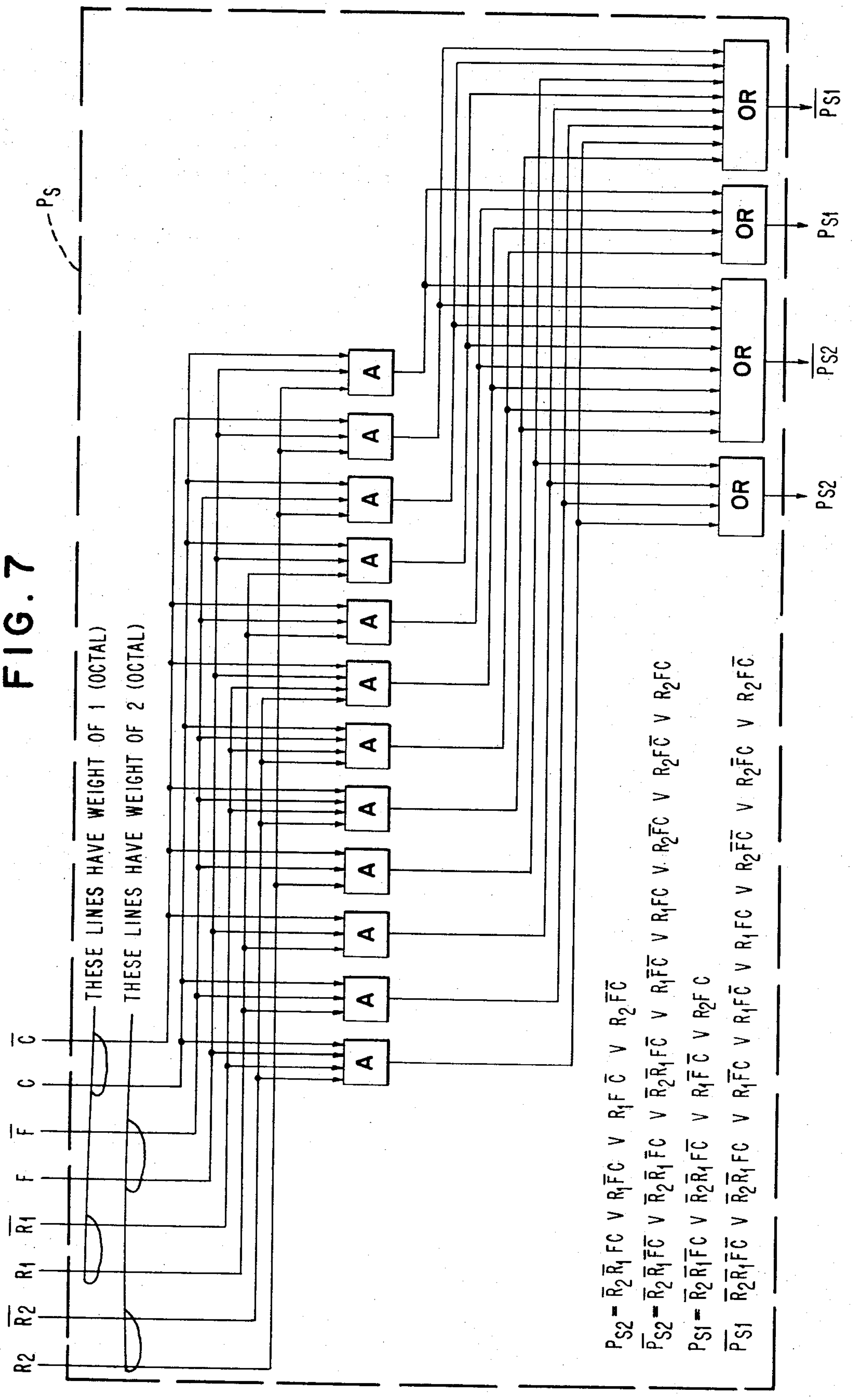
FIG. 7 is a logical schematic diagram of a $P_S$ box of the system of FIGS. 2A–L.

FIG. 6 is a logical schematic diagram for the boxes $P_A$ shown on FIG. 2. FIG. 7, which is quite similar to FIG. 6, is the logical schematic for the boxes $P_S$ on FIG. 2. The top inputs to these boxes are clearly labelled and correspond to the R, F, and C inputs likewise shown on FIG. 2. The relative octal weights to be given to the various input lines are also shown on these two figures. It being noted that the carries may only have the value of 1 or 0, hence only a single pair of lines is required for this input. Similarly, the feedback inputs (F) may only have an input of 2 or 0 and again only a single pair of lines is required as will be understood. However, the remainder inputs (R) may have a value of 0, 1 or 2, thus, two pairs of lines are required as indicated by the legend $R_1$ and $R_2$. The logical equations for the various outputs in both of these boxes are clearly shown on FIGS. 6 and 7 and the truth tables for these two devices are shown in FIGS. 9A and 9B. As stated previously, the various conditions of inputs and outputs are shown in the truth tables in octal digit format. The function of the $P_A$ boxes is to add all three inputs R, C, and F and produce an output modulo 3. The output can only be a 0, 1, or 2, thus requiring only four output lines as shown. The $P_S$ boxes add the R and C inputs and subtract the F input and produce the least positive remainder Modulo 3. Thus, if the result of the operation is a −1, the output would be +2 and if the result was −2, the output would be +1 as will be readily understood.

Figure 8:
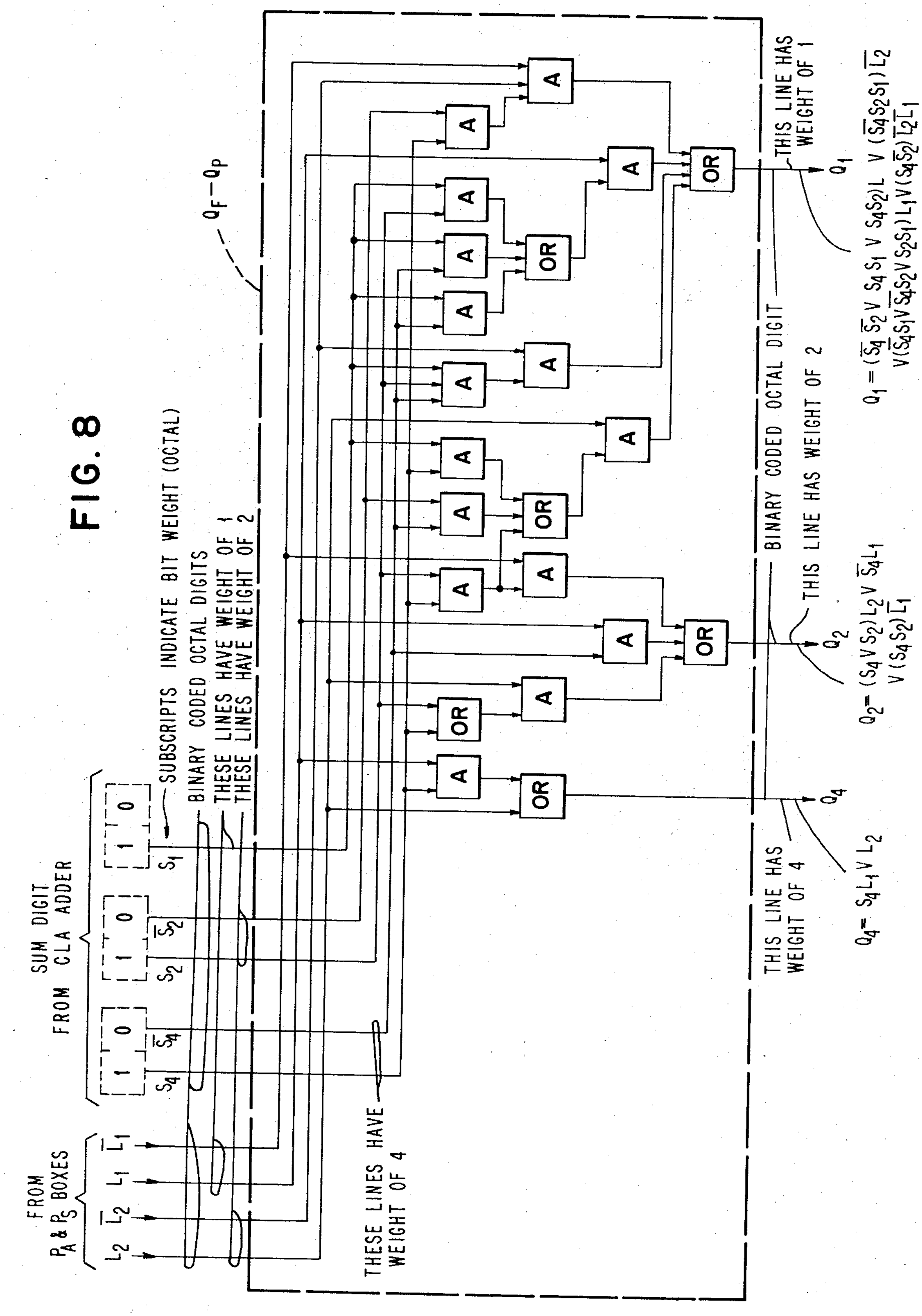
FIG. 8 is a logical schematic diagram of the $Q_F$–$Q_P$ box of the system of FIGS. 2A–L.

Finally, the contents of the $Q_F$–$Q_P$ boxes are shown in the logical schematic diagram of FIG. 8. These boxes obtain one input as the sum digit from the Carry Look-Ahead Adder and the other input from the various P boxes. These inputs are clearly labelled on FIG. 8. The one exception to this is the $Q_F$–$Q_P$ box 10 which produces the high order quotient digit. In this case the single high order carry out from the Adder forms the left-hand input to this box, i.e., $C_8{}^8$. Since this input can only be a 1 or a 0, only 2 top right input lines would be required for this box. However, the design of the box is considered quite straight forward and is not shown separately. The function of the $Q_F$–$Q_P$ boxes is to combine the respective inputs and divide the result by 3 and produce an integer output disregarding the remainder. The truth table for these boxes is shown on FIG. 14C where again the respective inputs and outputs are shown in octal digit format.

Having thus described the detailed functional block diagram of the composite FIG. 2A–L and the detailed logical schematics of FIGS. 3–8, three examples of the operation of the present invention illustrating the operation of the present Addition/Division System will be set forth with reference to the FIGS. 10A–C, 11A–C, and 12A–C. In all of these figures, the system organization of FIG. 2 is used in a somewhat simplified format wherein the Carry Look-Ahead Adder and specific logic control are not detailed for sake of simplicity. It will be noted that at the top of these figures, the various N and M input digits are shown in circles, i.e. the actual octal digit value. The interim outputs and inputs to the various functional blocks are also indicated as octal numbers appearing adjacent to the input and output lines. Thus, the functioning of the system may be followed step by step by referring to these drawings.

Figure 10A:
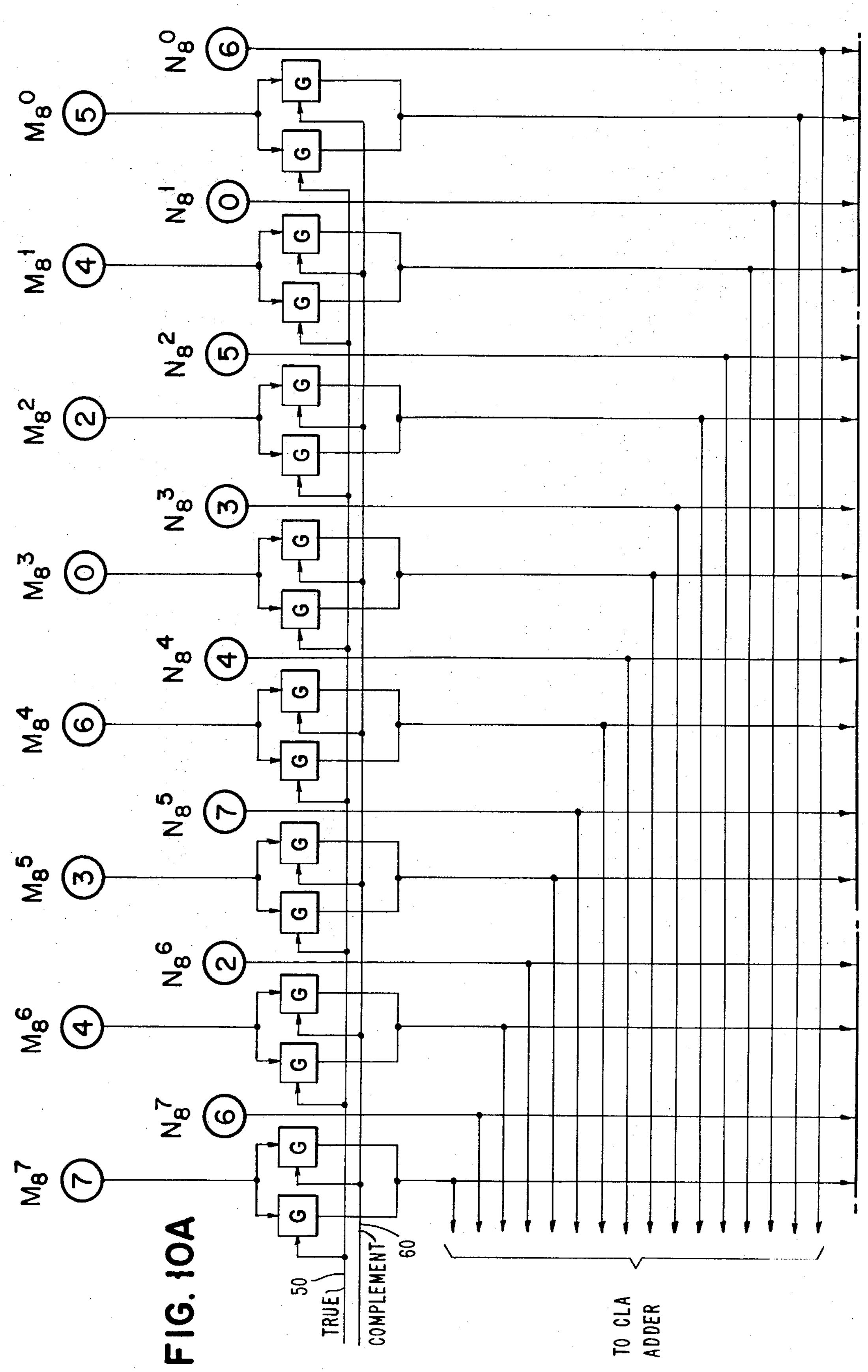
FIGS. 10A–C comprise a combination flow chart and functional block diagram of the present Addition/Division system illustrating a first numerical example.
Figure 10B:
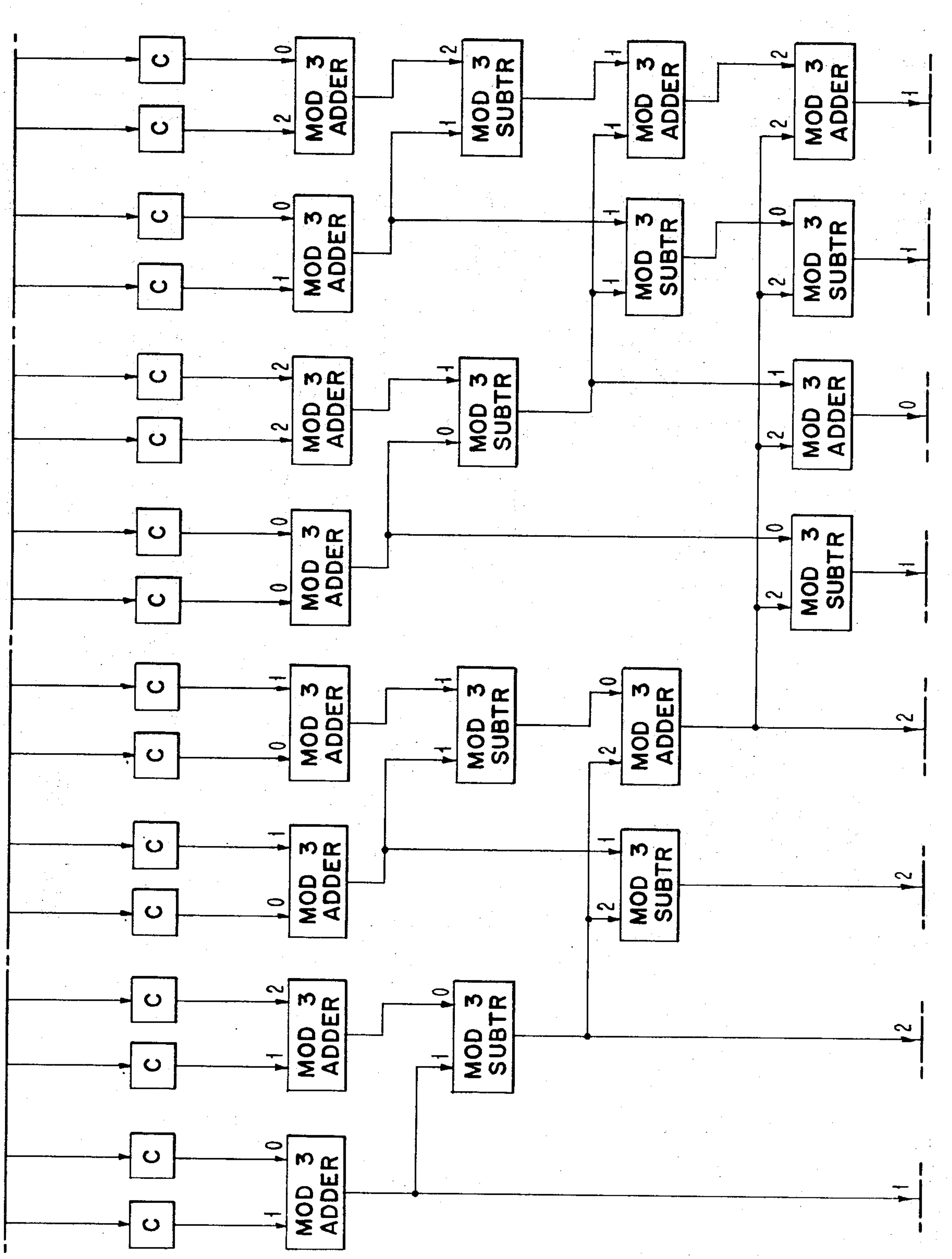
Figure 10:
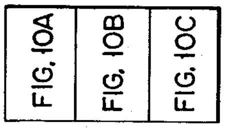
FIG. 10 is an organizational drawing for FIGS. 10A–C.
Figure 10C:
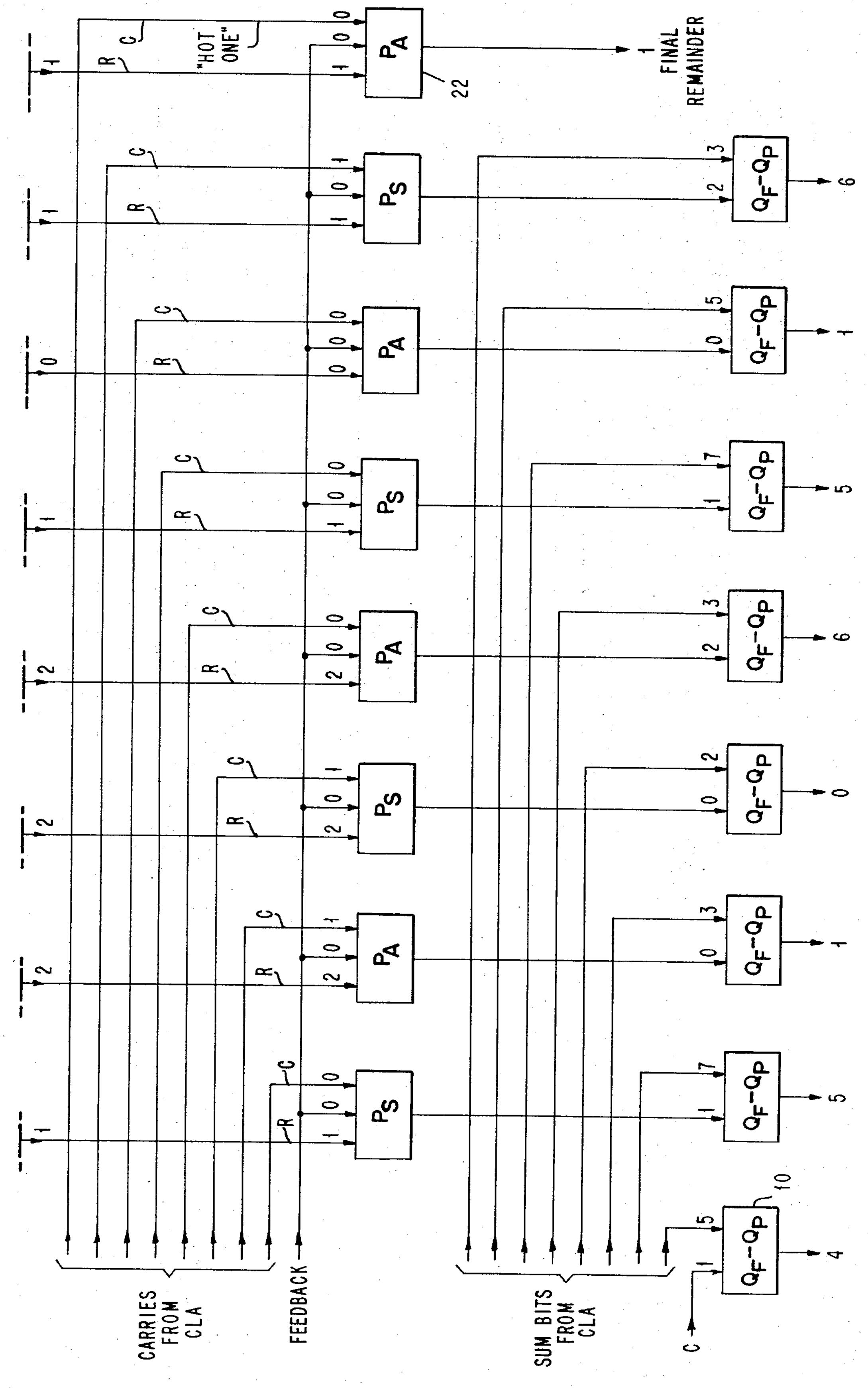

FIG. 10 illustrates an example where 2 eight digit octal numbers are to be added and their sum divided by 3. In this situation the overflow or high order carry out is to be included in the final quotient. As will be remembered from the previous description, this operation calls for the following three specialized input conditions. First, a 0 must appear on the carry line into the $P_A$ box 22 in Remainder Stage, zeros must be gated into all of the P boxes via the Feedback line, and any carry out which exists from the high order stage of the Carry Look-Ahead Adder must be entered in the $Q_F$–$Q_P$ box 10. As will be noted, all three of these conditions are shown on FIG. 10.

For the numerical example illustrated in FIG. 10, the addition of the two octal numbers, N and M, can be done numerically as shown below. The carries are indicated by the circled ones and zeros appearing to the upper left of the order in which they originate.

```
(N)          6 2 7 4 3 5 0 6
(M)          7 4 3 6 0 2 4 5
             ---------------
             ①⓪①①⓪⓪⓪①
            1 5 7 3 2 3 7 5 3
```

The nine sum bits 1, 5, 7, 3, 2, 3, 7, 5, 3 appear on the input lines to the $Q_F$–$Q_P$ boxes of FIG. 10 which come from the "Sum Bits From CLA." It will be noted that the two high order sum bits 1 and 5 both appear as the inputs to the $Q_F$–$Q_P$ box 10 wherein the one represents the high order carry out. Because this overflow carry of one is to be included in the sum, line 12 (see FIG. 2 for the following logical circuitry description) is enabled. This will in turn cause gates 14, 16, and 20 to be enabled. Because the operation to be performed is addition (include carry) the "true" line 50 becomes active thus enabling the gates 52 so that the number M will be presented in its true form. This line also enables the gates 54, 58 and 60. Gates 14 and 60 allow the overflow carry, if one exists, to be transmitted to the $Q_F$–$Q_P$ device 10. Gates 16 and 54 ensure that the carry input to the low order of the adder and also the C input to the $P_A$ device 22 is a 0 by causing the $\overline{C}_8{}^0$ line to be activated. Gate 20 causes the Feedback line to apply a 0 to all of the $P_S$ and $P_A$ devices. (Enable the $\overline{F}$ line.)

Thus proceeding with the description of the numerical example, the division by 3 of the previous addition may be done longhand as indicated below.

| | | | | | | | | | | |
|---|---|---|---|---|---|---|---|---|---|---|
| | 0 | 4 | 5 | 1 | 0 | 6 | 5 | 1 | 6 | 1/3 |
| 3√ | 1 | 5 | 7 | 3 | 2 | 3 | 7 | 5 | 3 | |
| | −0 | +8 | +8 | +0 | +0 | +16 | +8 | +0 | +16 | |
| | 1 | 13 | 15 | 3 | 2 | 19 | 15 | 5 | 19 | |
| | −0 | −12 | −15 | −3 | −0 | −18 | −15 | −3 | −18 | |
| | (1) | (1) | (0) | (0) | (2) | (1) | (0) | (2) | (1) | |

( ) represent the left-hand inputs to the $Q_F$–$Q_P$ boxes.

In the above example all of the numbers in parentheses represent the high order inputs to the $Q_F$–$Q_P$ with the exception of box 10 which of course has no propagated remainder input. It will further be noted that the right most number in parenthesis or the "1" is the final remainder from the $P_A$ box 22. Thus, it will be seen that the output of the $P_S$ and $P_A$ boxes represent the generation of all of the necessary propagated remainders with carries taken into consideration to produce the proper result. As stated previously, by following the various inputs to the different functional blocks on FIG. 10, the interstage or interblock inputs may be readily seen and the detailed operation of the system becomes clearly apparent.

Figure 11A:
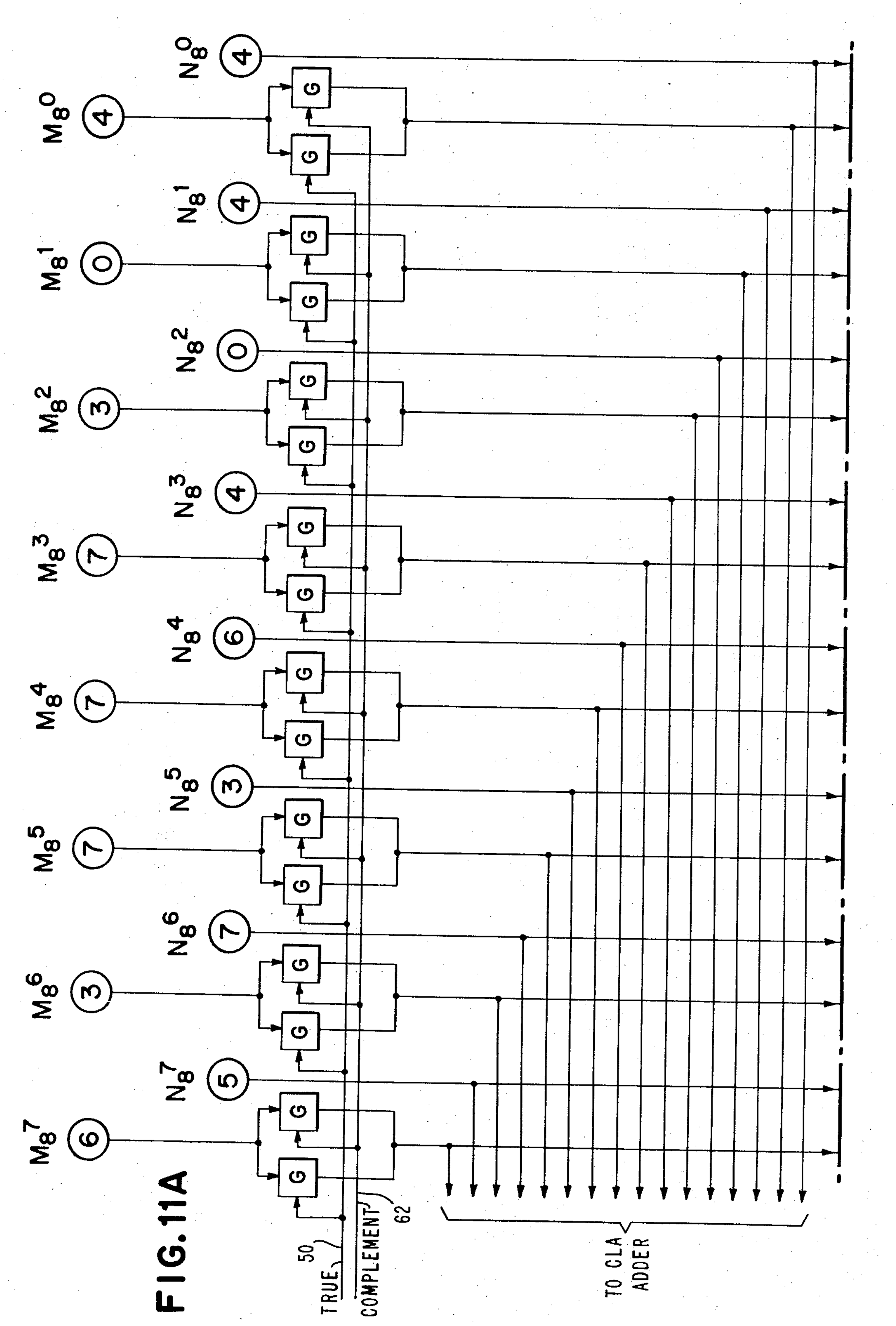
FIGS. 11A–C comprise a combination flow chart and functional block diagram of the present Addition/Division system illustrating a second numerical example.
Figure 11B:
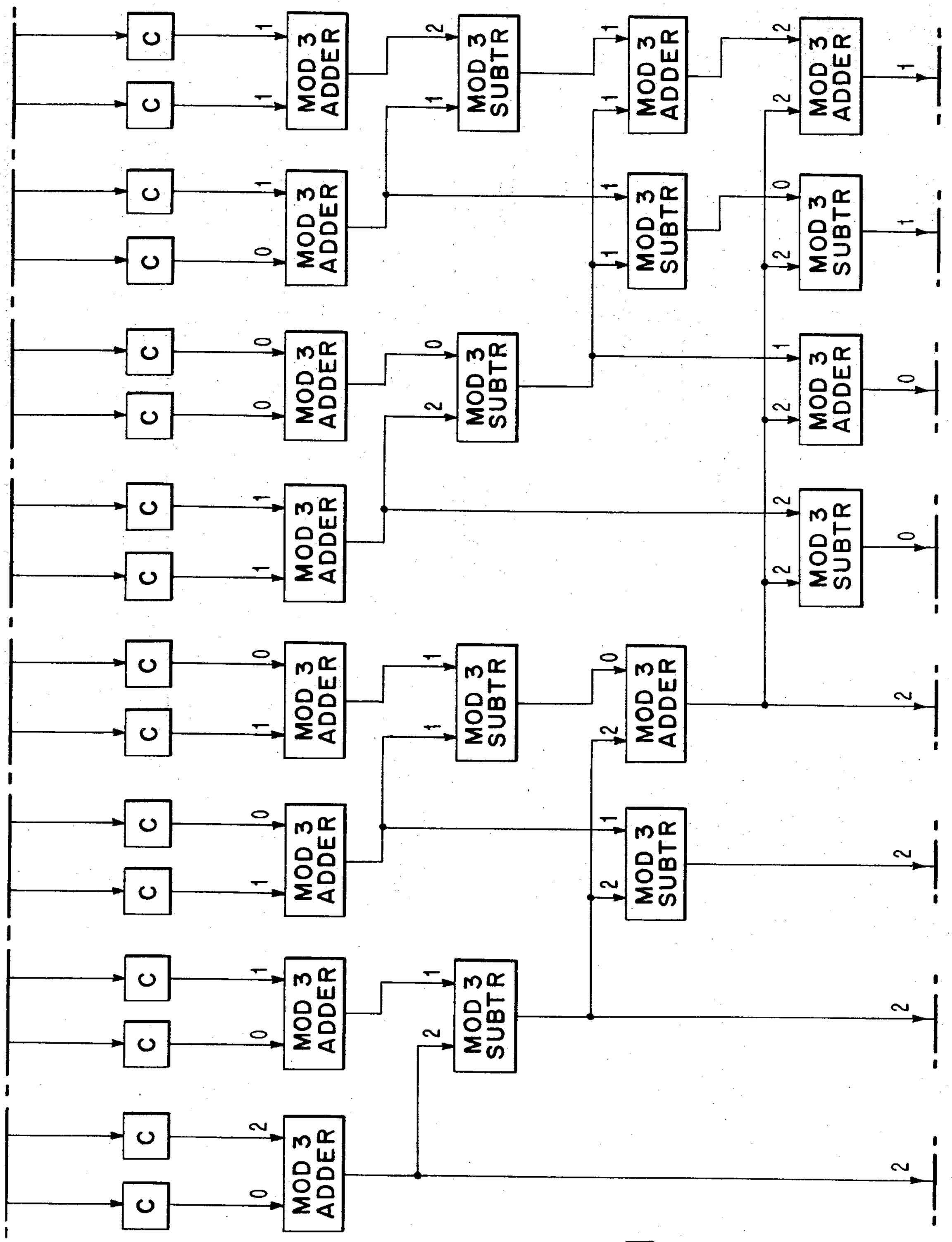
Figure 11:
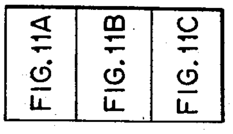
FIG. 11 is an organizational drawing of FIGS. 11A–C.
Figure 11C:
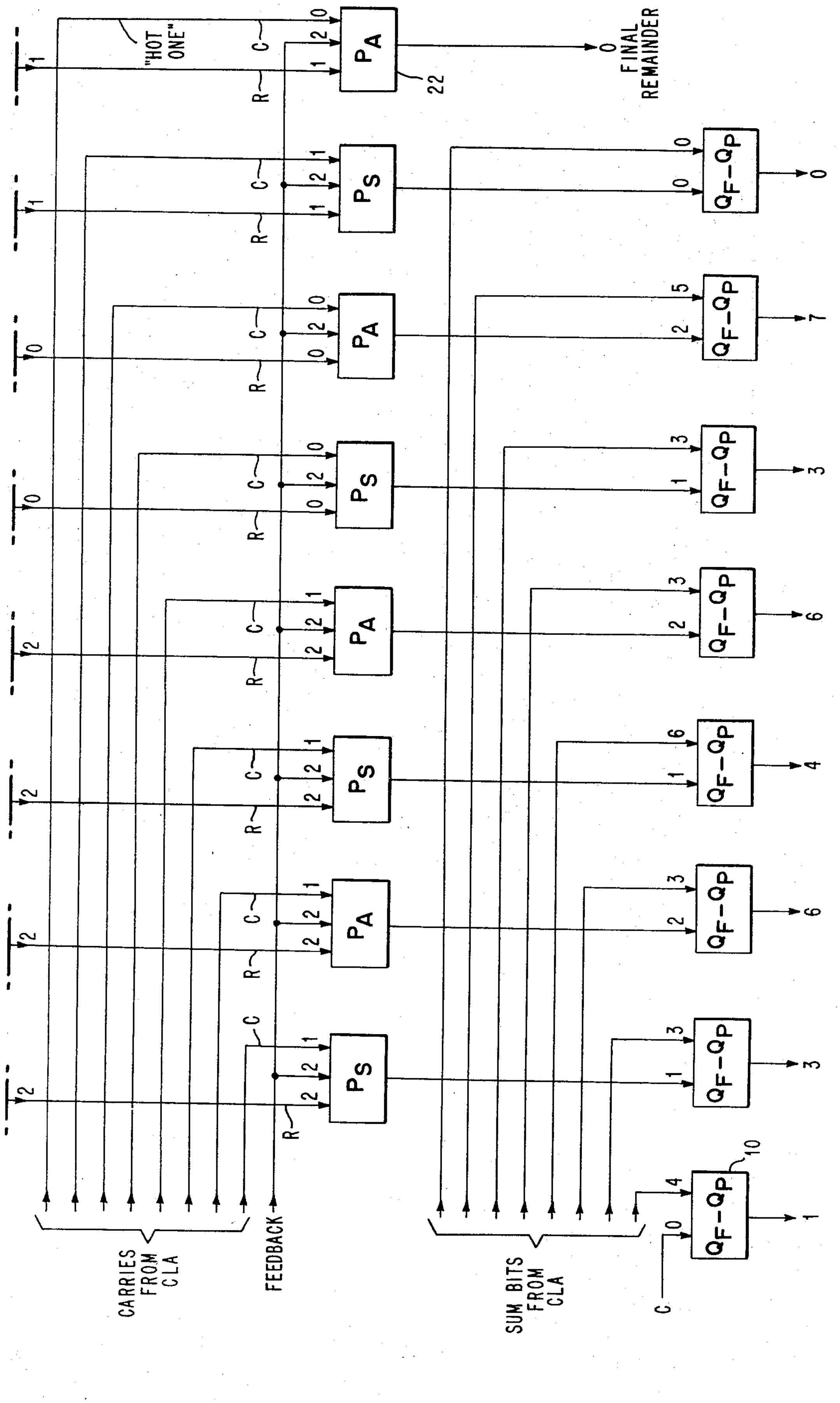

FIG. 11 illustrates a similar numerical example of an addition but in this case it is specified to the system that the overflow carry is *not* to be included in the final sum. As will be remembered from the previous description, in this case, the "hot one" ($P_8{}^0$), Feedback and the high order carry out ($C_8{}^8$) must be handled in the following manner. Since this is a regular addition, there will be no "hot one" injected, therefore, a zero must be inserted in the $P_A$ box 22. Further, since the system has been specifically instructed that the high order carry out will not be considered, a high order carry out of zero must be forced or entered into the $Q_F$–$Q_P$ box 10. Finally, a test of the highest order carry out must be made and if a carry out is actually encountered, this signal $C_8{}^8$ on FIG. 2 must be utilized to enable the Feedback line (F=2). The zero is gated into the $P_A$ box 22 by energization of the line 50, 28, the gate circuits 16 and 54. The output of gate circuit 54 gates a zero into the CLA Adder and to $P_A$ box 22. The zero is gated into the $Q_F$–$Q_P$ box 10 from line 28 through gate circuit 26, OR gate 27, gate 60, OR gate 61 and finally into box $Q_F$–$Q_P$ 10. Finally in the present example since a carry out will occur the Feedback line is energized by the output appearing on the $C_8{}^8$ line, this output passing through gate circuit 24 which is energized by line 28, OR box 25, gate 58, OR gate 59 and hence to bring up the Feedback line which appropriately gates a 2 into all of the $P_S$ and $P_A$ boxes to enter the correction factor necessitated by the carry out having been considered in the remainder circuitry as explained previously.

Referring again to the example of FIG. 11, the addition can be done as indicated in the following numerical example wherein the carries are indicated by the circled "ones" and "zeros" appearing to the upper left of the particular sum digits.

| | | | | | | | | |
|---|---|---|---|---|---|---|---|---|
| | 5 | 7 | 3 | 6 | 4 | 0 | 4 | 4 |
| | 6 | 3 | 7 | 7 | 7 | 3 | 0 | 4 |
| | ① | ① | ① | ① | ⓪ | ⓪ | ① | |
| 1 | 4 | 3 | 3 | 6 | 3 | 3 | 5 | 0 |

The first eight sum digits beginning at the right appear as the inputs to the $Q_F$–$Q_P$ boxes in FIG. 11. Because the overflow digit of the lefthand one is not to be included in the sum, zero is forced as the left-hand input to the $Q_F$–$Q_P$ box 10 as just explained. Since this operation was an addition, the "true" line 50 was enabled thus enabling the gate 52 so that the number M was entered into the CLA Adder and the remainder generating circuitry. Referring again to the above example, it will be noted that all of the circled carries, except the left most one, appear as the C inputs to the P boxes beginning with the $P_S$ box immediately to the left of the $P_A$ box 22. As stated previously, the energization of the Feedback line by the existence of a high order carry out brings up the output line on FIG. 2 marked $C_8{}^8$. Two's are caused to be gated into all of the $P_S$ and $P_A$ devices. As described previously, this Feedback input actually would have a weight of 8 (because of radix 8) but because 8 is congruent to the numeral 2 (Modulo 3), two's are alternatively added and subtracted in these remainder adjustment boxes to compensate for the previous consideration of the high order carry out in the earlier computations by the Remainder Generating Circuitry. Proceeding now with the numerical example of FIG. 11, the eight low order digits are divided by 3 as follows, remembering that the overflow carry out is to be disregarded.

| | | | | | | | | |
|---|---|---|---|---|---|---|---|---|
| | 1 | 3 | 6 | 4 | 6 | 3 | 7 | 0 |
| 3√ | 4 | 3 | 3 | 6 | 3 | 3 | 5 | −0 |
| | −0 | +8 | +16 | +8 | +16 | +8 | +16 | −0 |
| | 4 | 11 | 19 | 14 | 19 | 11 | 21 | (0) |
| | −3 | −9 | −18 | −12 | −18 | −9 | −21 | −0 |
| | (1) | (2) | (1) | (2) | (1) | (2) | (0) | (0) |

In the above longhand division, it will be noted that the numbers in parentheses represent the remainders to be propagated between quotient digits. It will further be noted that by comparing these remainders with FIG. 11 that these numbers correspond to the right-hand inputs to all of the $Q_F$–$Q_P$ boxes beginning with the one immediately to right of $Q_F$–$Q_P$ box 10. It will be further noted that the right most remainder in the above example of 0 corresponds to the final remainder for this example which is likewise 0. As with FIG. 10, all of the numerals appearing as inputs to the various functional boxes in FIG. 11 clearly illustrate the manner in which the various computations are made in these functional boxes and a study of these inputs will clearly indicate the manner in which the remainders are propagated, carries generated and assimilated and the final quotient computation made.

Figure 12A:
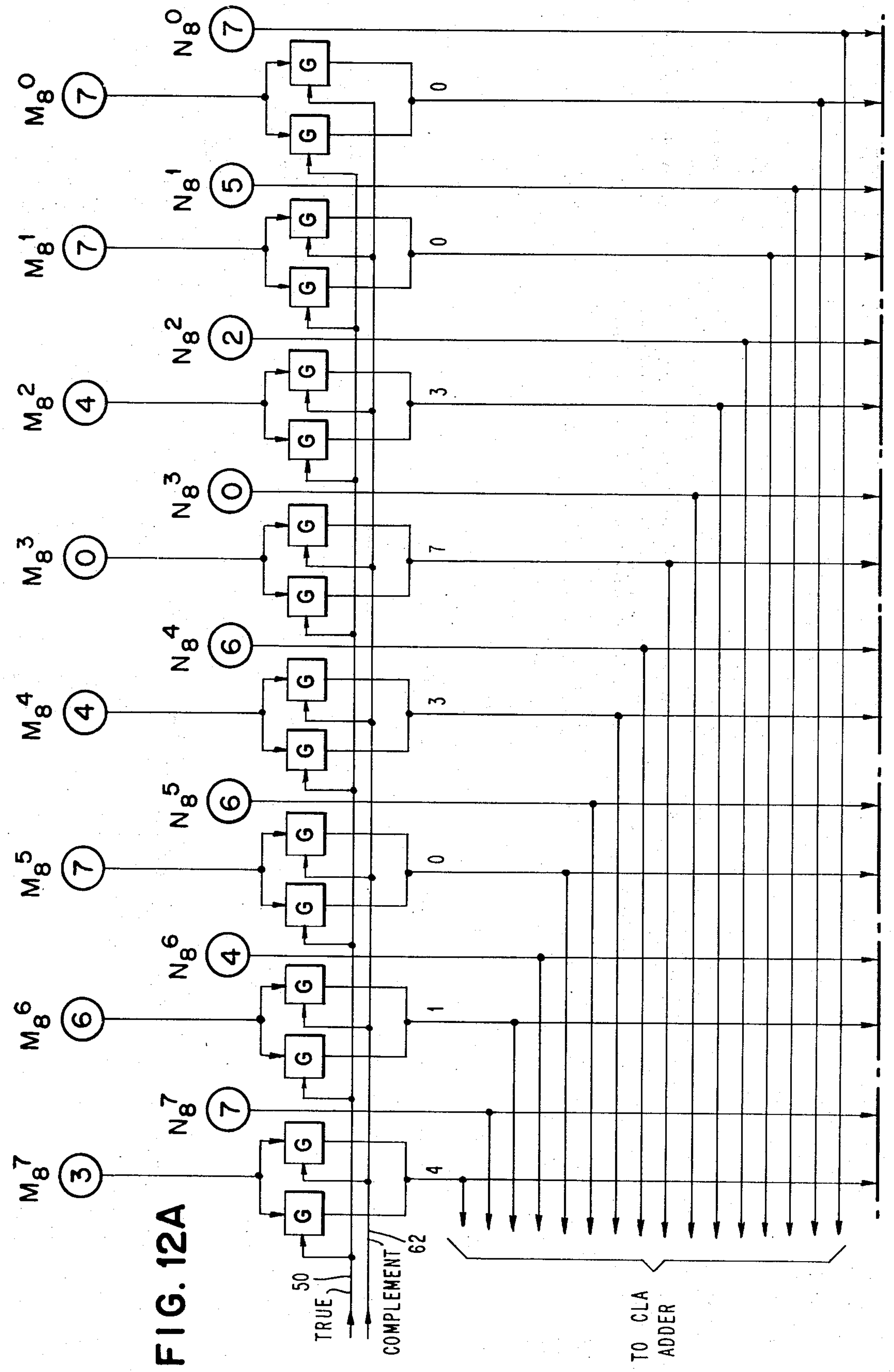
FIGS. 12A–C comprise a combination flow chart and functional block diagram of the Addition/Division system of the present invention illustrating a third numerical example.
Figure 12B:
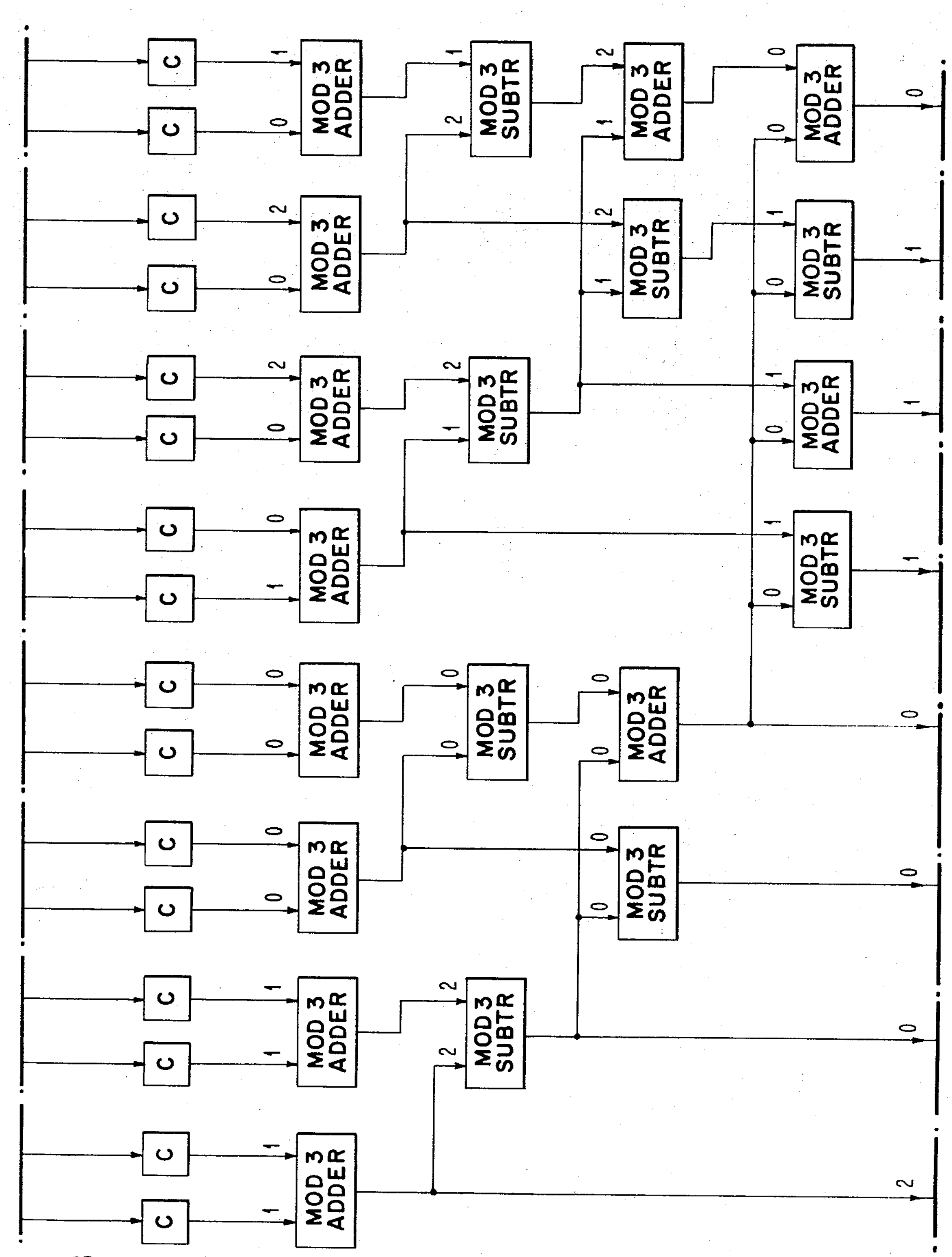
Figure 12:
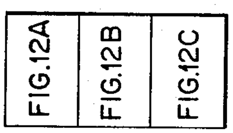
FIG. 12 is an organizational drawing of FIGS. 12A–C.
Figure 12C:
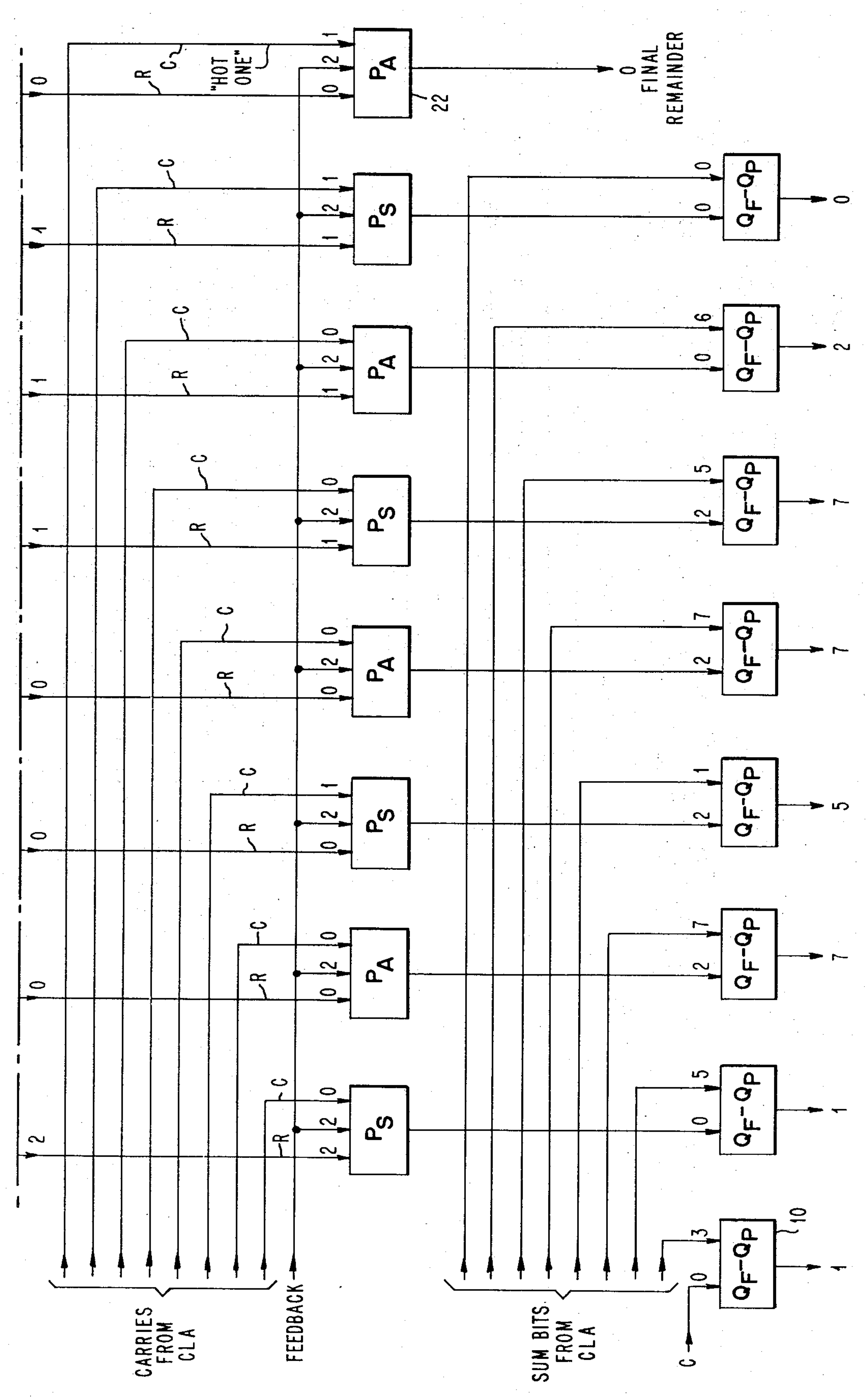

The example of FIG. 12 is one wherein the index M is to be subtracted from the base N and again the result divided by the fixed divisor of 3. For this situation the complement line 62 will be activated instead of the "true" line 50. Thus, the complement gates 72 will be enabled and their outputs will gate the 7's complement of M into both the Remainder Generating Circuitry and the CLA Adder. In this example the two numbers are N=74660257 (octal) and M=36740477 (octal). The complement of M is 41037300 as will be understood and it will be noted that these are the numbers gated into the left-hand C boxes in each of the Quotient Generating Stages of FIG. 12. As will be readily understood by one skilled in the art, an algebraic addition of a negative number or a subtraction is accomplished by taking the complement of the subtrahend and adding the two numbers together and adding a "hot one" to the sum to produce the final true result. This "hot one" is produced by the line 62 enabling gate circuit 64 to bring up the $C_8^0$ input line which introduces said "hot one" into the CLA Adder and into the $P_A$ box 22 in the Remainder Stage. The proper Feedback signal is produced by line 62 enabling gate 68 whose output passes through OR gate 59 which enables the Feedback line (Adder) to introduce a 2 into all of the $P_S$ and $P_A$ boxes. Finally, the high order carry out is to be specifically disregarded. Accordingly, the zero input to the $Q_F$–$Q_P$ box 10 ($\overline{C}_8^8$) is made active by the line 62 energizing gate circuit 70 whose output passes through OR gate 61 to energize said $\overline{C}_8^8$ input.

The two numbers and N and the complement of M can be added as follows:

```
      7  4  6  6  0  2  5  7
      4  1  0  3  7  3  0  0
      ----------------------
 ┌──→ ①  ⓪  ⓪  ①  ⓪  ⓪  ⓪  ⓪
 │    3  5  7  1  7  5  5  7
 │                      "1"←"hot one"
 │    ----------------------
 │       ⓪  ⓪  ①  ⓪  ⓪  ⓪  ①
 │    3  5  7  1  7  5  6  0 ←Sum Digits
 └This carry is disregarded.
```

From the above numerical example, again, the sum digits appearing on the bottom line are those entering the $Q_F$–$Q_P$ boxes on FIG. 12 which digits are, as stated previously, produced by the CLA Adder. The carry digits shown in the circles are those appearing as the carry inputs to the $P_S$ and $P_A$ boxes appearing to the left of $P_A$ box 22. The "hot one" as stated previously appears as the "1" carry input ($C_8^0$) to the $P_A$ 22.

Continuing now with the numerical example of FIG. 12, the sum determined by the above addition will now be divided by the fixed divisor 3 as indicated below.

```
      1     1     7     5     7     7     2     0
   ---------------------------------------------
 3√   3     5     7     1     7     5     6    −0
     −0    −0   +16   +16   +16   +16    −0    −0
     --    --   ---   ---   ---   ---    --    --
      3     5    23    17    23    21     6     0
     −3    −3   −21   −15   −21   −21    −6    −0
     --    --   ---   ---   ---   ---    --    --
     (0)   (2)   (2)   (2)   (2)   (0)   (0)   (0)
```

The above longhand division example is the same as for the numerical examples of FIGS. 10 and 11, it being noted that the final quotient digits appear on top and the interdigit remainders are the numbers in parentheses at the bottom of the example. It will be further noted that these remainders correspond to the left-hand inputs to all of the $Q_F$–$Q_P$ boxes with the exception of $Q_F$–$Q_P$ box 10. And fiinally, that the right-hand (0) remainder corresponds to the final remainder for the problem which in turn corresponds to the output of the $P_A$ box 22.

From the above three examples, it is believed that the operation of the present system, utilizing a radix of 8 and a fixed divisor of 3, will be readily understood by a person skilled in the art.

CONCLUSIONS

The preceding detailed description of the preferred embodiment of the present invention as set forth in FIG. 2 especially with reference to the three numerical examples illustrated in FIGS. 10, 11 and 12 clearly explains the operation of the present addition/division system under all anticipated situations of use. As will be readily appreciated, the system may be utilized for both positive and negative indexing and the high order bit may be selectively truncated or deleted from the calculation as desired.

All necessary logic and controls are included in the system so that the system operator need only specify whether, for example, the index is positive or negative and whether or not the high order carry out is to be utilized in the final division operation. Further, while the present embodiment has been illustrated utilizing a radix of 8 and a fixed divisor of 3, as the most practical utilization of the concepts of the invention, it will be readily understood that other radices and/or fixed divisors might be desired. It is believed that the teachings of the present invention together with the numerical examples, and the design of the remainder look-ahead circuitry for other bases and fixed divisors as set forth in the co-pending application, will allow a person skilled in the art to modify the present addition/division system to accommodate such different radices and/or divisors.

As clearly indicated, the major functional block of the Remainder Generating Circuitry is described generally by FIG. 13B. By substituting the desired radix and fixed divisor and computing the desired multiplication factor for various Remainder Generating Stages, it is believed that a system capable of handling any desired radix or fixed divisor could readily be constructed. It will of course be realized that the Feedback would have to be changed to accommodate a different radix system, however, this similarly would be obvious to a person skilled in the art. For example, if base 10 were used, the Feedback would have to be some power of (base) numeral 10 (Modulo X) with appropriate polarities chosen to account for displacement of a particular correction point from the high order carry out stage as was adequately explained previously.

It is to be noted that in most present day computers, conventionally using binary data systems, radices of 8, 16, 32, etc. could most conveniently be used as they may easily be converted from the binary to the aforementioned radices by appropriate grouping of bits. While the fixed divisor may be dictated by numerous considerations, wherever possible it is most convenient to use such numbers as 3, 5, etc. with appropriate radix systems such that the multiplaction factors in the various remainder generating blocks be kept to a plus or minus one wherever possible with attendant simplication in the logic circuitry required in these units.

As stated previously in the description of the Remainder Generating Circuitry of the preferred embodiment of FIG. 2, a number of modifications of the disclosed circuitry could be made to either reduce or increase the amount of parallelism in the remainder generation operation. The disclosed embodiment is believed to represent a reasonable compromise between hardware and time. Obviously, a greater or lesser degree of parallelism could be built into the circuitry depending upon the speed requirements and the amount of hardware that a designer would be willing to commit to the speeding up function.

While the actual contents of the individual AND, OR, and gate circuits have not been specifically set forth, these individual functional elements are notoriously old in the art and it is to be understood that they could readily be incorporated in either tube, standard semiconductor, or high level integrated circuit technologies without departing from the spirit and scope of the invention. As stated previously, the principle advantage of the present addition/division circuit is that by the utilization of parallel remainder generation, while the addition of the base and index addresses is proceeding, there results an overall unit time cycle very slightly exceeding that of the division alone. For the presently disclosed embodiment, it is anticipated that the complete system operation would not require over 33% more time to provide the desired quotient over the addition of said two addresses by themselves. Thus, by utilizing the principles of the present invention, considerable versatility may be added to a computer memory organization with little attendant increase in time necessary for computing addresses.

While the invention has been particularly shown and described with reference to a preferred embodiment thereof, it will be understood by those skilled in the art that various other changes in form and detail in addition to those previously mentioned may be made therein without departing from the spirit and scope of the invention.

What is claimed is:

1. A high speed addition/division system for adding and dividing a pair of N digit numbers by a fixed divisor, wherein the Nth digit is the lowest order digit, said system including:

N remainder generating stages associated with each pair of digits of said input numbers, N accumulator stages, each connected to the output of each remainder generating stage and N divider stages, wherein the *i*th accumulator stage is connected to the $(i+1)$th divider stage, each divider stage producing a quotient digit, a high speed adder for providing up to N+1 final sum digits and interdigit carries from said two input numbers and means for transmitting said interdigit carries to the appropriate accumulator stage and said sums to said divider stages, means in each accumulator stage for combining the carry for a particular sum digit pair with the remainder generated by the associated remainder generating stage and for producing an output representative of said combination, each said divider stage except the highest order stage including means operative for generating effective dividend digits by combining the sum digit from the associated adder stage with the output from the associated accumulator stage and for dividing said dividend digits by said fixed divisor to produce an integer quotient digit and wherein the highest order divider stage receives the associated sum digit and selectively receives a high order carry out from the adder.

2. A high speed addition/division system as set forth in claim 1 including Feedback means for introducing a correction factor into each accumulator stage when a high order carry out is to be disregarded in determining the final quotient of said operation.

3. A high speed addition/division system as set forth in claim 2 including means for introducing a "hot one" into the Nth accumulator stage for producing the final remainder and into the low order stage of said adder when a subtraction operation is encountered.

4. A high speed addition/division system for producing a quotient and remainder from two N digit numbers, wherein digit 1 is the highest order digit, of radix Z which must be added and the result divided by a fixed divisor X, said system comprising:

a high speed adder capable of producing up to $N+1$ final sum digits and up to N inter-digit carries used in obtaining said sum digits, N remainder generating stages, one associated with each pair of digits of said two numbers, N accumulator stages each connected to a respective remainder generating stage, and N divider stages, the Nth accumulator stage including means for generating an effective remainder digit comprising means for combining the remainder as computed by the Nth remainder generating stage, the carry digit from said adder and a correction factor when a high order digit from the adder is to be disregarded and for producing the least positive remainder modulo X, the output of the Nth accumulator stage comprising the final remainder, said divider comprising means for producing an effective two digit dividend including means for combining the output of the accumulator stage with the appropriate sum digit from said adder and for dividing said digit by the fixed divisor X to produce an integer quotient digit, wherein the *i*th accumulator stage is connected to the $(i+1)$th divider stage, said highest order divider stage including means for combining the high order sum digit from said adder with the high order carry out and dividing same by said fixed divisor X to produce an integer quotient digit.

5. An addition/division system as set forth in claim 4 wherein each said remainder generating stage includes means for extracting all possible multiples of the fixed divisor X from the combined remainders passed down from all higher order stages and for producing the least positive remainder therefrom less than X and for passing said least positive remainder to the accumulator stage associated with said remainder generating stage.

6. An addition/division system as set forth in claim 5 wherein each remainder generating stage includes two converters for extracting all multiples of the fixed divisor X from each of the pair of digits of said two input numbers of the adjacent higher order and means for adding the outputs of said converters and for producing the least positive remainder thereof less than X.

7. A high speed addition/division system as set forth in claim 6 wherein each said remainder generating stage further includes assimilation means for multiplying a remainder from a higher order stage if present by a factor determined by the formula: $k=[(Z \text{ modulo } X)^y]$ modulo $X$ (least positive or negative remainder) where $y$=the displacement of the stage from which the higher order remainder is propagated; and means for adding the product obtained to the output of said last named adder means and extracting multiples of X to produce a least positive remainder.

8. A high speed addition/division system as set forth in claim 7 wherein each remainder generating stage includes as many cascaded assimilation means as are necessary to assimilate all higher order remainders wherein the quantity to be added is the output of the immediately preceding assimilation means in the same stage.

9. An addition/division system as set forth in claim 8 wherein the two N digit numbers utilized are in a radix 8 format and the fixed divisor X equals 3 wherein each assimilation means becomes an adder for the two inputs thereto when the displacement Y is an even number, and wherein said assimilation becomes a subtractor when the displacement Y is an odd number.

10. An addition/division system as set forth in claim 5 including means for selectively excluding consideraton of a high order carry out in the final quotient resulting from the addition of said two N digit numbers including means for selectively gating the high order carry out, if one occurs, from said adder into the high order digit divider stage.

11. An addition/division system as set forth in claim 10 including means for gating a corrective signal to all of said accumulator means when a high order carry out is to be excluded from said final quotient operable upon the actual occurrence of a high order carry out to gate a corrective factor F to each said accumulator wherein F is determined by the formula: $F=-[(Z \text{ modulo } X)^Y]$ where Y equals the displacement of the particular accumulator from the high order quotient generating stage.

12. A high speed addition/division system as set forth in claim 11 wherein said two N digit input numbers are organized in radix 8 format and said fixed divisor is 3 wherein said corrective factor is the quantity +2 for all accumulators located an even number of stages away from said high order quotient generating stage and wherein said correction factor is −2 for all accumulators located an odd number of stages away from said high order quotient generating stage.

13. A high speed addition/division system as set forth in claim 11 including means for subtracting one of said two N digit numbers from the other wherein one of said numbers is gated to the adder and the remainder generating circuitry in complement form and processed therein with the other number in its true form, said system further including means for injecting a binary 1 into the low order stage of said adder in addition to said two input numbers and for injecting a 1 into the Nth accumulator stage, together with means for enabling said feedback circuitry to inject the corrective feedback into each of said accumulators and for excluding a carry out from the adder into the high order digit divider.

References Cited

UNITED STATES PATENTS

| | | | |
|---|---|---|---|
| 3,319,057 | 5/1967 | Githens et al. | 235—164 |
| 3,234,366 | 2/1966 | Davis et al. | 235—156 |
| 3,344,261 | 9/1967 | Hornung | 235—160 |

MALCOLM A. MORRISON, Primary Examiner

D. H. MALZAHN, Assistant Examiner

U.S. Cl. X.R.

235—156